United States Patent [19]

Isogai et al.

[11] Patent Number: 4,576,732
[45] Date of Patent: Mar. 18, 1986

[54] FERROELECTRIC LIQUID CRYSTAL COMPOUNDS AND LIQUID CRYSTAL COMPOSITIONS

[75] Inventors: Masato Isogai; Shintaroo Hattori, both of Hitachi; Kishiroo Iwasaki, Hitachiouta; Teruo Kitamura, Katsuta; Akio Mukoh, Mito; Takashi Inukai, Yokohama; Kenji Furukawa, Yokosuka; Kanetsugu Terashima; Shinichi Saitoh, both of Yokohama, all of Japan

[73] Assignee: Hitachi, Ltd., Tokyo, Japan

[21] Appl. No.: 555,617

[22] Filed: Nov. 28, 1983

[30] Foreign Application Priority Data

Nov. 26, 1982 [JP] Japan .................. 57-206106
Dec. 25, 1982 [JP] Japan .................. 57-234561
Jul. 29, 1983 [JP] Japan .................. 58-137800

[51] Int. Cl.$^4$ ............ C09K 3/34; G02F 1/13; C07C 69/76; C07C 69/88
[52] U.S. Cl. ............ 252/299.65; 252/299.01; 252/299.6; 252/299.63; 252/299.64; 252/299.66; 252/299.67; 252/299.68; 350/350 S; 560/35; 560/59; 560/61; 560/72; 560/73; 560/102; 560/106; 560/107; 560/108; 560/109
[58] Field of Search ........... 252/299.6, 299.63, 299.64, 252/299.65, 299.66, 299.67, 299.68, 299.01; 350/350 S; 560/59, 35, 60, 61, 72, 73, 102, 106, 107, 108, 109

[56] References Cited

U.S. PATENT DOCUMENTS

| | | | |
|---|---|---|---|
| 4,065,489 | 12/1977 | Steinstrasser et al. | 252/299.65 |
| 4,113,647 | 9/1978 | Coates et al. | 252/299.62 |
| 4,149,413 | 4/1979 | Gray et al. | 252/299.64 |
| 4,195,916 | 4/1980 | Coates et al. | 252/299.63 |
| 4,257,911 | 3/1981 | Gray et al. | 252/299.65 |
| 4,341,653 | 7/1982 | Inufai et al. | 252/299.63 |
| 4,400,059 | 8/1983 | Nagae et al. | 252/299.1 |

FOREIGN PATENT DOCUMENTS

| | | | |
|---|---|---|---|
| 53-111032 | 9/1978 | Japan | 252/299.6 |
| 57-63380 | 4/1982 | Japan | 252/299.65 |
| 899536 | 1/1982 | U.S.S.R. | 252/299.64 |

OTHER PUBLICATIONS

C.A., 94:208491j (1981).
Bubel, O. N., et al., J. Org. Chem. USSR, vol. 15 (4), pp. 717-719 (1979).
Abdulin, A. Z., et al., Zh. Org. Khim., vol. 18, No. 10, pp. 2170-2173 (Oct. 1982).
Abdulin, A. Z., et al., J. Org. Chem. USSR, vol. 18 (10), pp. 1913-1915 (Mar. 1983).
Heppke, G., et al., Z. Naturforsch., vol. 32a, pp. 895-901 (1977).
C.A., vol. 100: 77474y (1984).
C.A., vol. 100: 94597h (1984).
C.A., vol. 97: 118270u (1982).
Gray, G. W., et al., Mol. Cryst. Liq. Cryst., vol. 34 (Letters), pp. 211-217 (1977).
Gray, G. W., et al., Mol. Cryst. Liq. Cryst., vol. 37, pp. 189-211 (1976).
Gray, G. W., et al., Mol. Cryst. Liq. Cryst., vol. 37, pp. 157-188 (1976).
Gooddy, J. W., et al., Liquid Crystals and Ordered Fluids, vol. 4, Las Vegas, NV. Griffin, A., Ed., Plenum Press, N.Y., pp. 1-32 (1984) (Mar. 29-Apr. 1, 1983).

*Primary Examiner*—Teddy S. Gron
*Attorney, Agent, or Firm*—Antonelli, Terry & Wands

[57] ABSTRACT

The present invention is characterized by a smectic liquid crystal compound represented by the following formula:

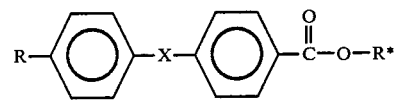

wherein R is selected from alkyl and alkoxy groups; X from (Abstract continued on next page.)

-continued
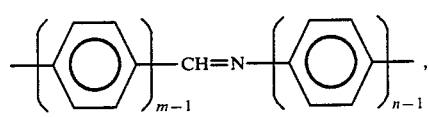
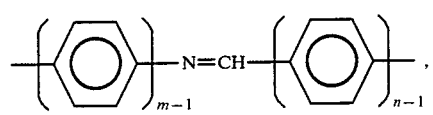
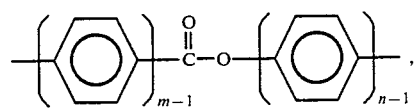
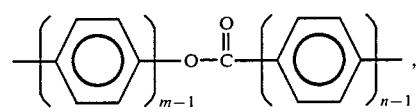
-continued
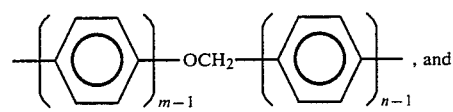, and
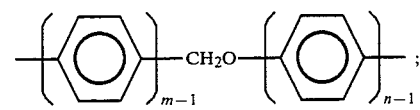;
m and n are natural numbers; and R* is an optically active group containing an asymmetric carbon atom, and a liquid crystal composition containing said compound as a component. This compound is excellent in optical stability and high-speed response.
12 Claims, 5 Drawing Figures

FERROELECTRIC LIQUID CRYSTAL

TABLE 1

| No. | Chemical structure | Phase transition temperature (°C.) (note) |
|---|---|---|
| 1 | 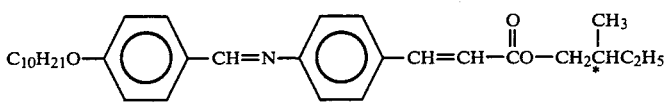 | $C \xrightarrow{73} S_{C^*} \xrightleftharpoons{93} S_A \xrightleftharpoons{116} I$ ; $S_{H^*} \downarrow 60$ |
| 2 | 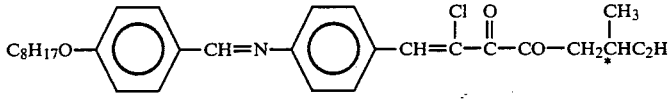 | $C \xrightarrow{41} S_A \xrightleftharpoons{66} I$ ; $S_{C^*} \downarrow 38$ |
| 3 |  | $C \xrightarrow{92} S_A \xrightleftharpoons{104} I$ ; $S_{C^*} \downarrow 75$ |
| 4 | 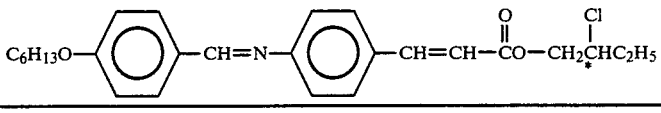 | $C \xrightleftharpoons{60} S_{H^*} \xrightleftharpoons{64} S_{C^*} \xrightleftharpoons{78} S_A \xrightleftharpoons{135} I$ |

COMPOUNDS AND LIQUID CRYSTAL COMPOSITIONS

BACKGROUND OF THE INVENTION

1. Field of the Invention

The present invention is related to a smectic liquid crystal compound and a liquid crystal composition containing said liquid crystal compound, particularly to a smectic liquid crystal compound and a liquid crystal composition excellent in response and highly suitable as the material for ferroelectric liquid crystals.

2. Description of the Prior Art

Liquid crystal display is widely applied at present. Twisted nematic (TN) type display is applied in most of them, which is advantageous because of low electric power consumption and little fatigue of eyes, as it is of light-receiving type. On the other hand, however, it has a disadvantage of long response time. High-speed response has been required recently for display devices, and liquid crystal materials are being improved for this purpose. However, there is still a great gap in response time between this type of materials and those of luminescent type such as light emitting diode, EL (electroluminescence), or plasma display. Approaches have been continued therefore to find a novel display method in which response can be made with high speed, with advantages of the light-receiving type of liquid crystal display consuming small electric power. One of these approaches is a display device in which an optical switching phenomenon of ferroelectric liquid crystals is utilized (see, e.g., N. A. Clark and S. T. Lagerwall in Appl. Phys. Lett. 36, 899 (1980)). A ferroelectric liquid crystal was discovered by R. B. Meyer et al. (J. Physique, 36, L-69 (1975)), and considered to belong to a chiral smectic C phase (hereinafter abbreviated as $S_{C^*}$) or to a chiral smectic H phase (hereinafter abbreviated as $S_{H^*}$) based on it molecular orientation. The compounds listed in Table 1 have been heretofore known as ferroelectric liquid crystal compounds (Ph. Martino Lagarde, J. Physique, 37, C3-129 (1976)).

In Table 1, C stands for a crystal phase, $S_{C^*}$ for a chiral smectic C phase, $S_{H^*}$ for a chiral smectic H phase, $S_A$ for a smectic A phase, and I for an isotropic phase.

These ferroelectric liquid crystal compounds have a C—C double bond (—CH=C<), which results in weak optical resistance, that is, the compound is easily isomerized with light in a short period into cis-form, not displaying a liquid crystal phase. The compounds are not therefore suitable for practical use as liquid materials for display elements. The inventors have arrived at the present invention as a result of studies with the purpose of providing compounds with a stable molecular structure.

SUMMARY OF THE INVENTION

An object of the present invention is to provide an optically stable smectic liquid crystal compound and a liquid crystal composition containing said liquid crystalline compound.

In the present specification, a smectic liquid crystal compound is defined as a compound which shows a smectic A phase, chiral smectic C phase, or any smectic liquid crystal phase under appropriate conditions. The smectic liquid crystal compound of the present invention is not therefore limited to ferroelectric liquid crystal compounds.

The ferroelectric liquid crystal compound of the present invention is characterized by being represented by the general formula (I):

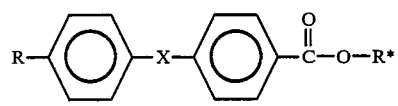

wherein R is selected from among alkyl and alkoxy groups; X from among

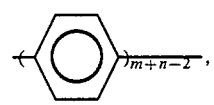

-continued

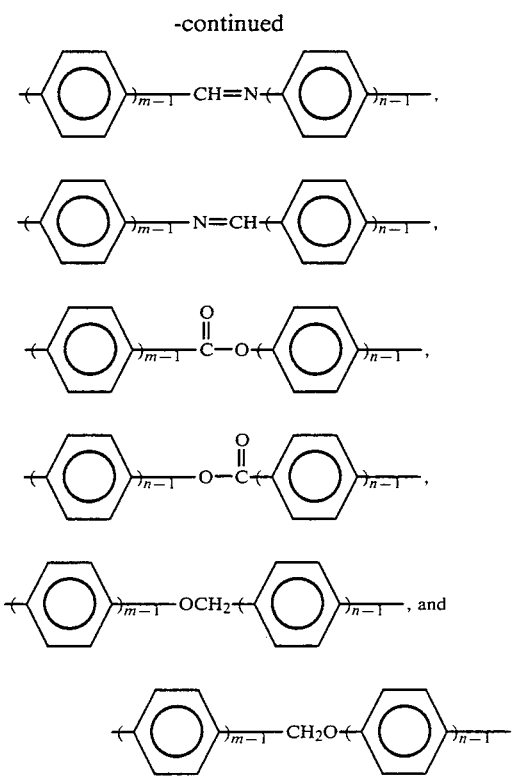

wherein m and n are natural numbers; and R* is an optically active group containing an asymmetric carbon atom. R may be straight-chain, branched, or cyclic, and preferably straight-chain. Exemplary ferroelectric liquid crystal compounds are represented by the general formula (Ia):

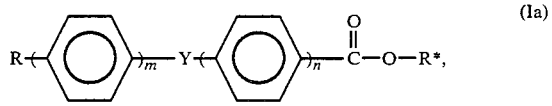
(Ia)

wherein R contains 7 or more carbon atoms, and Y is selected from among CH=N, N=CH,

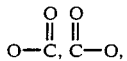

$OCH_2$ and $CH_2O$; m, n is 1 or 2 and $m = n \neq 2$. Typical liquid crystal compounds represented by the general formula (I) are those represented by the following general formula (II):

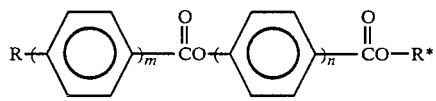
II wherein R is preferred to have 20 or less carbon atoms, further preferred to have 7 or more carbon atoms when m and n are both 2, and m and n are preferred to be 1 or 2.

The second invention of the present application is an invention of a liquid crystal composition which comprises at least two liquid crystal components, at least one of which contains a liquid crystal compound represented by the above general formula (I).

As mentioned above, a ferroelectric liquid crystal phase usually belongs to an $S_C^*$ or $S_H^*$ phase. These two liquid crystal phases are characterized in that the molecules are oriented forming layers and are aligned aslant in a specified direction on the surface of the layers, and the direction of the slope is shifted little by little between the layers so that the phase has a helical structure as a whole (R. B. Meyer, Mol. Cryst. Liq. Cryst, 40, 33 (1977)).

Spontaneous polarization is in a perpendicular direction to the helical axis, which is perpendicular to the surface of the layer. By the way, it was found as a result of the detailed examination of the relationship between the molecular structure and the appearance of ferroelectricity that the following two conditions are necessary for a molecular structure to induce the above-described molecular orientation and spontaneous polarization in the liquid crystal phase: to have an optically active group at the terminal of the molecule to induce a helical structure, and to have a substituent having an electric dipole at the terminal of the molecule, in a direction approximately perpendicular to the major axis of the liquid crystal molecule, to induce spontaneous polarization. Accordingly, it is understood that the C—C double bond (—CH=CH—) between a benzene ring and an ester linkage

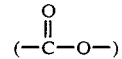

in conventional ferroelectric liquid crystal compounds is not a molecular structure essential for the appearance of a ferroelectric liquid crystal phase. The compounds represented by formula (I) of the present invention not only satisfy the above two conditions but also have optical stability unlike conventional ferroelectric liquid crystal compounds, because they have no C—C double bonds. Moreover, as shown in the examples described below, the compounds of the present invention represented by formula (I) are characterized not only by a wide temperature range (hereinafter abbreviated as MR) where they show ferroelectricity by themselves, but also in that the MR of other ferroelectric liquid crystal compounds can be expanded to around room temperature by mixing the compound of the present invention with other compounds including conventional ferroelectric liquid crystal compounds or the compounds of the present invention represented by formula (I). The obtained ferroelectric liquid crystal compositions can be employed in the above-mentioned display device in which an optical switching phenomenon of ferroelectric liquid crystals is utilized for high-speed response optical switching.

Among the compounds represented by the above-mentioned general formula (II), liquid crystal compounds represented by the following general formula (III):

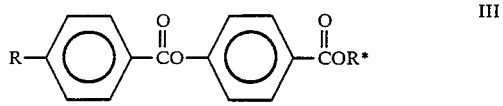
III those represented by the following general formula (IV):

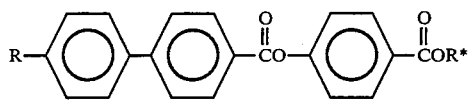

and those represented by the following general formula (V):

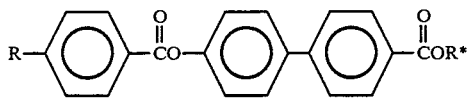

are preferred. R and R* in the above formulae have the same meaning as described in the general formula (I) and (II).

The compounds of formulae (III) and (IV) are most suitably prepared by reacting an ester of p-hydroxybenzoic acid containing an optically active group with an acid halide of the corresponding p-alkoxy- or alkylbenzoic acid, 4-alkyl-4'-biphenylcarboxylic acid, or 4-alkoxy-4'-biphenylcarboxylic acid in a basic solvent such as pyridine. The compound of formula (V) is most suitably prepared by reacting an ester of 4-hydroxy-4'-biphenylcarboxylic acid containing an optically active group with an acid halide of a p-alkyl- or p-alkoxybenzoic acid in the same manner.

The esters of p-hydroxybenzoic acid and of a 4-hydroxy-4'-biphenylcarboxylic acid containing an optically active group are preferably prepared from these hydroxy carboxylic acids and an alcohol containing an optically active group in the presence of a mineral acid such as sulfuric acid as catalyst, or by the alcoholysis of p-hydroxybenzonitrile and 4-hydroxy-4'-cyanobiphenyl with an alcohol containing an optically active group in the presence of an acid catalyst.

The compounds represented by the following general formula (VI) are also typical liquid crystal compounds of the general formula (I):

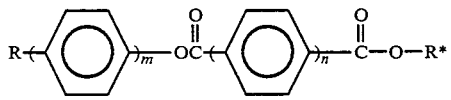

among which those represented by the following general formulae (VII) and (VIII) are preferable:

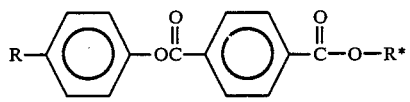

The compounds represented by these formulae are synthesized by reacting a corresponding p-alkyl- or p-alkoxyphenol, or 4-alkyl- or 4-alkoxy-4'-hydroxybiphenyl, with a corresponding acid halide in a basic solvent such as pyridine. The acid halide is synthesized by reacting a p-alkoxycarbonylbenzoic acid, obtained by the oxidation of a p-alkoxycarbonylbenzaldehyde containing an optically active group with an oxidizing agent such as chromic acid, with an oxalyl halide, preferably oxalyl chloride, or thionyl chloride.

The compounds represented by the following general formulae (IX), (X), (XI), (XII), and (XIII) are also typical smectic liquid crystal compounds of the present invention:

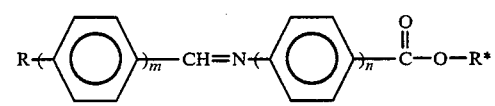

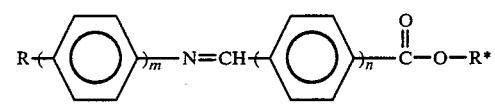

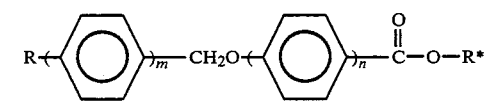

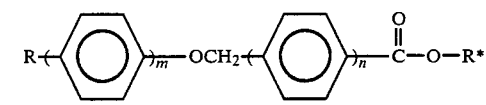

In the compound of the above formula (IX), the compound is smectic when R is an alkoxy group, while it does not show a smectic phase when R is an alkyl group. R and R* in the above formulae have the same meaning as described in formula (I).

Compared with the conventional ferroelectric liquid crystal compounds listed in Table 1, the compound of formula (IX) is characterized by having no C—C double bonds (—CH=CH—), a factor of optical instability, as well as no azomethine bonds, a factor of instability to water. As the result, the compound of formula (IX) is a highly stable substance. Moreover, the compound shows ferroelectricity in a desirable temperature range around room temperature, which is not easily inferred from the known results of experiments. The compounds of the following three series are reported with their liquid crystal phase transition temperatures by G. W. Gray et al. (Mol. Cryst. Liq. Cryst., 37, 157 (1976)) as analogous compounds of the compounds of formula (IX):

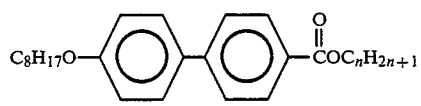

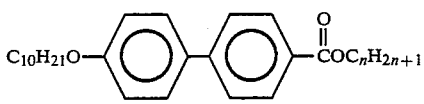

-continued

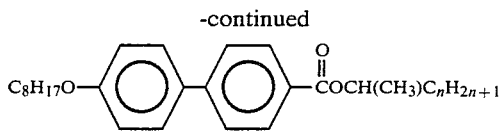

wherein $C_nH_{2n+1}$ stands for a straight-chain alkyl group. On the other hand, the fact that the alkyl groups contained in the compounds of formula (IX) are all branched and at the same time optically active, and their $S_C^*$ phase shows ferroelectricity have not been known at all heretofore. It is further noted that the compound represented by the following formula (XIV), having a similar chemical structure to that of the compound of the present invention, is described in Japanese Patent Laid-Open No. 11944/1982:

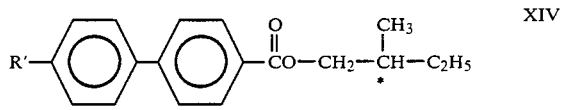

wherein R' stands for an alkyl group containing 1 to 10 carbon atoms. These compounds, however, do not show smectic phases at all, but only show a cholesteric phase at low temperatures. As readily understood from the formula, the chemical structure of the compound of formula (IX) is characterized by having a biphenyl skeleton whereto an alkoxy group is bonded at position 4 and a

group at position 4'. The alkoxy group in position 4 is one containing 1 to 18, preferably 4 to 14 carbon atoms, and the R* in the

group in position 4' is an optically active group represented by the following structural formula:

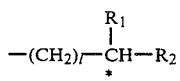

wherein $R_1$ and $R_2$ are each an alkyl, alkoxy, or cyano group or a halogen atom, being different except in case $R_1$ and $R_2$ are both halogen atoms, and l is preferably an integer from 0 to 8. Particularly preferable compounds of formula (IX), from the viewpoint of practical preparation such as availability of optically active starting materials, are those wherein l is 1, $R_1$ is $CH_3$, and $R_2$ is $C_2H_5$, namely those wherein R* is a 2-methylbutyl group, or those wherein l is 0, $R_1$ is $CH_3$, and $R_2$ is $C_6H_{13}$, namely those wherein R* is a 2-octyl group.

Moreover, as shown in the examples described below, the compound of formula (VI) is effective when incorporated into other liquid crystal compounds in lowering the temperature range of ferroelectricity of the resulting liquid crystal composition to around room temperature.

The compound of the formula (IX) is most suitably prepared by reacting a 4-alkyloxy-4'-biphenylcarboxylic acid with a halogenating agent such as thionyl chloride or phosphorus pentachloride to form an acid halide, and then reacting the obtained acid halide with an optically active alcohol in a basic solvent such as pyridine. The compound can be also prepared otherwise by the generally known esterification method.

The compound of general formula (X) is preferably prepared by reacting an optically active alcohol (R*OH) with p-nitrobenzoyl chloride

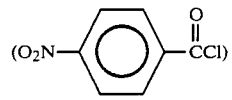

to form an ester of p-nitrobenzoic acid

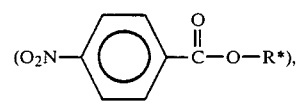

thereafter reducing the obtained p-nitrobenzoate to form a corresponding ester of p-aminobenzoic acid

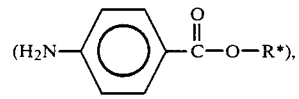

and further reacting the obtained p-aminobenzoate with a p-alkyl- or p-alkoxybenzaldehyde

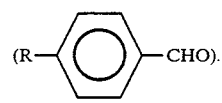

The compound of the general formula (XI) is preferably prepared by reacting a terephthalaldehydic acid

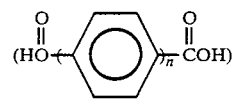

with a thionyl halide, preferably thionyl chloride, or an oxalyl chloride, preferably oxalyl chloride, to form a terephthalic acid halide

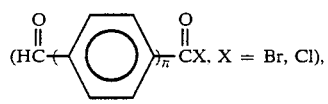

thereafter reacting the obtained product with an optically active alcohol (R*OH) in a basic solvent to form a p-(alkoxycarbonyl)benzaldehyde

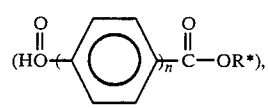

and further reacting the obtained product with a p-alkyl- or p-alkoxy-4'-aminobiphenyl.

The compound of the general formula (XII) is prepared by reacting

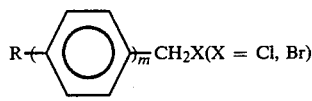

with

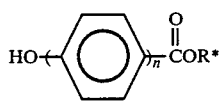

in the presence of an alkali. The

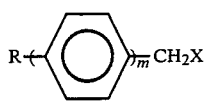

is prepared by reacting

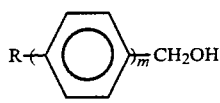

with hydrogen halide.

The compound of the general formula (XIII) is most suitably prepared by the following route:

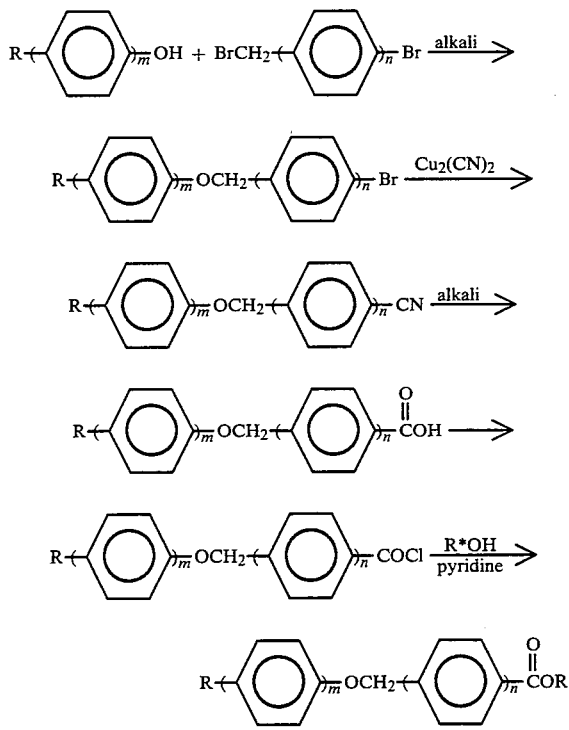

A spontaneous polarization value of the compound of formula (I) is about twice or more than of a 2-methylbutyl p-alkoxybenzylidene-p'-amino cinnamate, which is one of the known ferroelectric liquid crystal compounds shown in Table 1.

The compounds of formula (I) are preferably used as a composition consisting of two or more of them, rather than as a single compound, because the melting point is lowered by mixing, thus forming a thermodynamically stable $S_C^*$ phase in a temperature range including room temperature. These liquid crystal compositions can be obtained by mixing some of the compounds of formula (I) with each other or by mixing a compound of formula (I) with a known ferroelectric liquid crystal substance listed in Table 1, e.g., 2-methylbutyl p-alkyloxybenzylidene-p'-amino cinnamate. The obtained liquid crystal composition in either method shows ferroelectricity. These ferroelectric liquid crystal compositions can be employed in the above-mentioned display device in which an optical switching phenomenon of ferroelectric liquid crystals is utilized. As shown in the examples below, high-speed response optical switching with a response time of about 1 millisecond is conducted with these liquid crystal compositions. In the compounds of formula (II) to (XIII), those in the form of racemate do not show ferroelectricity because they have no helical crystalline structure. They show ferroelectricity for practical use only when they are resolved into d- or l-form.

The preferable optically active groups contained in the compound represented by formula (I) of the present invention include, for example, 3-methylpentyl, 4-methylhexyl, 1-methylheptyl, or 2-methylbutyl groups, among which 2-methylbutyl

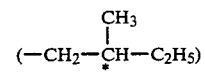

or 2-octyl group

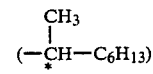

are suitable, as mentioned in the above description of the compound of formula (IX).

As described above, the smectic liquid crystal compounds of the present invention are freed of optically unstable carbon to carbon double bonds, and mostly show ferroelectricity around room temperature as shown in the examples below. Accordingly, the liquid crystal compound of the present invention is useful as a component of a ferroelectric liquid crystal composition and excellent in optical stability. A ferroelectric liquid crystal composition excellent in optical stability can be obtained by incorporating a liquid crystal compound of the present invention therein.

DETAILED DESCRIPTION OF THE PREFERRED EMBODIMENTS

Figure 1:
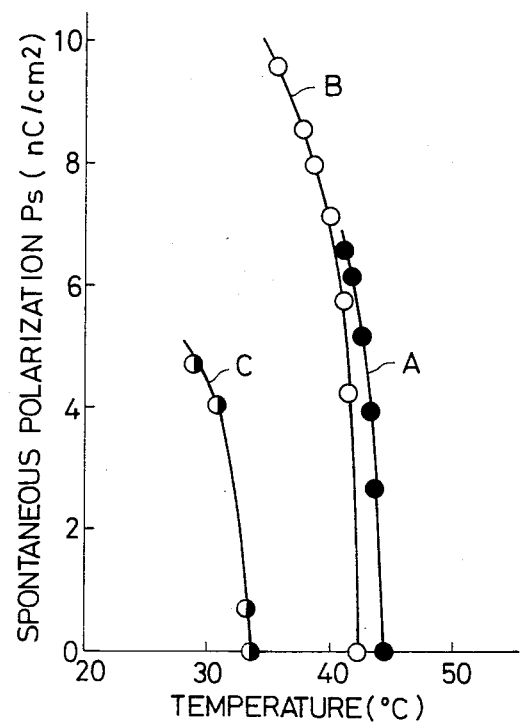
FIGS. 1 and 3 are graphical representations of the relationship between temperatures and spontaneous polarization values of the liquid crystal compounds of the present invention prepared according to the methods described in the examples.

The present invention will be described in more detail by the following examples. However, these examples are not to limit the scope of the present invention.

The phase transition temperature values in the following description may be varied slightly in dependence on the method of measurements or the purity of products.

EXAMPLE 1: Synthesis of p-n-decyloxybenzoic acid p'-(2-methylbutoxycarbonyl)phenyl ester

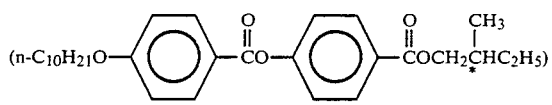

690 g of p-hydroxybenzoic acid, 650 g of (−)2-methylbutanol, 3 l of benzene, and 30 ml of conc. sulfuric acid were stirred under heating in a container provided with a Dean-Stark reflux condenser to remove generated water. After the reflux for about 11 hours, the solution was cooled and stripped of sulfuric acid by the addition of ice water. The reaction mother liquor was distilled of benzene after being washed by an aqueous solution of sodium carbonate and water to obtain oily p-hydroxybenzoic acid 2-methylbutyl ester.

13.9 g of p-n-decyloxybenzoic acid was heated with excess thionyl chloride for 1 hour under reflux. p-n-Decyloxybenzoic acid chloride was obtained after distilling unreacted thionyl chloride off. 10.6 g of the above prepared p-hydroxybenzoic acid 2-methylbutyl ester was dissolved in 40 ml of pyridine. When the solution was cooled, a toluene solution of said p-n-decyloxybenzoic acid chloride was admixed therewith under stirring to effect reaction at 80° C. for 2 hours. The solution was then acidified by the addition of ice and 6N hydrochloric acid. After the organic layers were washed with water, then with a 2N aqueous sodium hydroxide solution, and again with water, the solvent was distilled off. The residue was recrystallized twice from ethanol to obtain p-n-decyloxybenzoic acid p'-(2-methylbutoxycarbonyl)phenyl ester.

Elementary analysis for $C_{29}H_{40}O_5$:

|   | calculated | found |
|---|---|---|
| C | 74.32% | 74.2% |
| H | 8.60% | 8.6% |

Optical rotatory power: $[\alpha]_D^{23°}$ C. = +2.4° (in chloroform solution).

EXAMPLE 2

The following compounds which contain different groups from those of Example 1 as R (an alkyl or alkoxy group) of the general formula (III) can be prepared in the same manner as described in Example 1:

(1) p-n-heptyloxybenzoic acid p'-(2-methylbutoxycarbonyl)phenyl ester,
(2) p-n-octyloxybenzoic acid p'-(2-methylbutoxycarbonyl)phenyl ester,
(3) p-n-nonyloxybenzoic acid p'-(2-methylbutoxycarbonyl)phenyl ester,
(4) p-n-undecyloxybenzoic acid p'-(2-methylbutoxycarbonyl)phenyl ester,
(5) p-n-dodecyloxybenzoic acid p'-(2-methylbutoxycarbonyl)phenyl ester,
(6) p-n-tridecyloxybenzoic acid p'-(2-methylbutoxycarbonyl)phenyl ester,
(7) p-n-tetradecyloxybenzoic acid p'-(2-methylbutoxycarbonyl)phenyl ester,
(8) p-n-pentadecyloxybenzoic acid p'-(2-methylbutoxycarbonyl)phenyl ester,
(9) p-n-hexadecyloxybenzoic acid p'-(2-methylbutoxycarbonyl)phenyl ester,
(10) p-n-heptadecyloxybenzoic acid p'-(2-methylbutoxycarbonyl)phenyl ester,
(11) p-n-octadecyloxybenzoic acid p'-(2-methylbutoxycarbonyl)phenyl ester,
(12) p-n-nonadecyloxybenzoic acid p'-(2-methylbutoxycarbonyl)phenyl ester,
(13) p-n-eicosyloxybenzoic acid p'-(2-methylbutoxycarbonyl)phenyl ester,
(14) p-n-heptylbenzoic acid p'-(2-methylbutoxycarbonyl)phenyl ester,
(15) p-n-octylbenzoic acid p'-(2-methylbutoxycarbonyl)phenyl ester,
(16) p-n-nonylbenzoic acid p'-(2-methylbutoxycarbonyl)phenyl ester,
(17) p-n-decylbenzoic acid p'-(2-methylbutoxycarbonyl)phenyl ester,
(18) p-n-undecylbenzoic acid p'-(2-methylbutoxycarbonyl)phenyl ester,
(19) p-n-dodecylbenzoic acid p'-(2-methylbutoxycarbonyl)phenyl ester,
(20) p-n-tridecylbenzoic acid p'-(2-methylbutoxycarbonyl)phenyl ester,
(21) p-n-tetradecylbenzoic acid p'-(2-methylbutoxycarbonyl)phenyl ester,
(22) p-n-pentadecylbenzoic acid p'-(2-methylbutoxycarbonyl)phenyl ester,
(23) p-n-hexadecylbenzoic acid p'-(2-methylbutoxycarbonyl)phenyl ester,
(24) p-n-heptadecylbenzoic acid p'-(2-methylbutoxycarbonyl)phenyl ester,
(25) p-n-octadecylbenzoic acid p'-(2-methylbutoxycarbonyl)phenyl ester,
(26) p-n-nonadecylbenzoic acid p'-(2-methylbutoxycarbonyl)phenyl ester, and
(27) p-n-eicosylbenzoic acid p'-(2-methylbutoxycarbonyl)phenyl ester.

The phase transition temperatures of the p-n-alkoxybenzoic acid p'-(2-methylbutoxycarbonyl)phenyl esters prepared in Examples 1 and 2 are listed in Table 2. As understood from Table 2, these compounds have an alkyl group containing 7 or more carbon atoms, in which a monotropic $S_C^*$ phase was observed. The symbols used have the same meaning as in Table 1.

TABLE 2

| R— | Phase transition temperature (°C.) |
|---|---|
| $C_7H_{15}O—$ | $C \xrightarrow{42} S_A \xleftrightarrow{51} I$ <br> $\searrow 23$ <br> $S_C^*$ |

TABLE 2-continued

| R— | Phase transition temperature (°C.) |
|---|---|
| $C_8H_{17}O-$ | $C \xrightarrow{34} S_A \xrightleftharpoons{55} I$ , $S_{C^*} \nearrow 30$ |
| $C_9H_{19}O-$ | $C \xrightarrow{54} S_A \xrightleftharpoons{56} I$ , $S_{C^*} \nearrow 37$ |
| $C_{10}H_{21}O-$ | $C \xrightarrow{51} S_A \xrightleftharpoons{58} I$ , $S_{C^*} \nearrow 38$ |
| $C_{11}H_{23}O-$ | $C \xrightarrow{55} S_A \xrightleftharpoons{58} I$ , $S_{C^*} \nearrow 38$ |
| $C_{12}H_{25}O-$ | $C \xrightarrow{47} S_A \xrightleftharpoons{59} I$ , $S_{C^*} \nearrow 37$ |
| $C_{14}H_{29}O-$ | $C \xrightarrow{46} S_A \xrightleftharpoons{59} I$ , $S_{C^*} \nearrow 35$ |
| $C_{16}H_{33}O-$ | $C \xrightarrow{47} S_A \xrightleftharpoons{58} I$ , $S_{C^*} \nearrow 33$ |
| $C_{18}H_{37}O-$ | $C \xrightleftharpoons{56} S_A \xrightleftharpoons{57} I$ |

EXAMPLE 3: Synthesis of 4-n-heptyloxy-4'-biphenylcarboxylic acid p'-(2-methylbutoxycarbonyl)phenyl ester

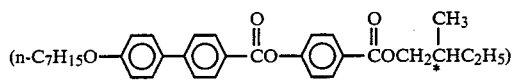

10 g of 4-n-heptyloxy-4'-biphenylcarboxylic acid and 50 ml of excess thionyl chloride were heated under reflux for 3 hours and thereafter unreacted thionyl chloride was distilled off to obtain 4-heptyloxy-4'-biphenylcarboxylic acid chloride.

A toluene solution of the obtained acid halide was dropped into the solution of Example 1, in which 7.2 g of p-hydroxybenzoic acid 2-methylbutyl ester is dissolved in 40 ml of pyridine. The solution was then treated in the same manner as described in Example 1 to obtain a crude product. The product was dissolved in toluene, freed of by-products through a chromatograph column of active alumina, and recrystallized twice from ethyl acetate to obtain 4-n-heptyloxy-4'-biphenylcarboxylic acid p'-(2-methylbutoxycarbonyl)phenyl ester.

Elemental analysis for $C_{32}H_{38}O_5$:

| | calculated | found |
|---|---|---|
| C | 76.46% | 76.4% |
| H | 7.62% | 7.7% |

Optical rotatory power: $[\alpha]_D^{23°} C. = +2.8°$ (in chloroform solution).

EXAMPLE 4

The following compounds which contain different groups from those of Example 3 as R (an alkyl or alkoxy group) of the general formula (IV) can be prepared in the same manner as described in Example 3:

(1) 4-methoxy-4'-biphenylcarboxylic acid p'-(2-methylbutoxycarbonyl)phenyl ester,
(2) 4-ethoxy-4'-biphenylcarboxylic acid p'-(2-methylbutoxycarbonyl)phenyl ester,
(3) 4-n-propoxy-4'-biphenylcarboxylic acid p'-(2-methoxybutoxycarbonyl)phenyl ester,
(4) 4-n-butoxy-4'-biphenylcarboxylic acid p'-(2-methylbutoxycarbonyl)phenyl ester,
(5) 4-n-pentyloxy-4'-biphenylcarboxylic acid p'-(2-methylbutoxycarbonyl)phenyl ester,
(6) 4-n-hexyloxy-4'-biphenylcarboxylic acid p'-(2-methylbutoxycarbonyl)phenyl ester,
(7) 4-n-octyloxy-4'-biphenylcarboxylic acid p'-(2-methylbutoxycarbonyl)phenyl ester,
(8) 4-n-nonyloxy-4'-biphenylcarboxylic acid p'-(2-methylbutoxycarbonyl)phenyl ester,
(9) 4-n-decyloxy-4'-biphenylcarboxylic acid p'-(2-methylbutoxycarbonyl)phenyl ester,
(10) 4-n-undecyloxy-4'-biphenylcarboxylic acid p'-(2-methylbutoxycarbonyl)phenyl ester,
(11) 4-n-dodecyloxy-4'-biphenylcarboxylic acid p'-(2-methylbutoxycarbonyl)phenyl ester,
(12) 4-n-tridecyloxy-4'-biphenylcarboxylic acid p'-(2-methylbutoxycarbonyl)phenyl ester,
(13) 4-n-tetradecyloxy-4'-biphenylcarboxylic acid p'-(2-methylbutoxycarbonyl)phenyl ester,
(14) 4-n-pentadecyloxy-4'-biphenylcarboxylic acid p'-(2-methylbutoxycarbonyl)phenyl ester,
(15) 4-n-hexadecyloxy-4'-biphenylcarboxylic acid p'-(2-methylbutoxycarbonyl)phenyl ester,
(16) 4-n-heptadecyloxy-4'-biphenylcarboxylic acid p'-(2-methylbutoxycarbonyl)phenyl ester,
(17) 4-n-octadecyloxy-4'-biphenylcarboxylic acid p'-(2-methylbutoxycarbonyl)phenyl ester,
(18) 4-n-nonadecyloxy-4'-biphenylcarboxylic acid p'-(2-methylbutoxycarbonyl)phenyl ester,
(19) 4-n-eicosyloxy-4'-biphenylcarboxylic acid p'-(2-methylbutoxycarbonyl)phenyl ester,
(20) 4-methyl-4'-biphenylcarboxylic acid p'-(2-methylbutoxycarbonyl)phenyl ester,
(21) 4-ethyl-4'-biphenylcarboxylic acid p'-(2-methylbutoxycarbonyl)phenyl ester,
(22) 4-n-propyl-4'-biphenylcarboxylic acid p'-(2-methylbutoxycarbonyl)phenyl ester,
(23) 4-n-butyl-4'-biphenylcarboxylic acid p'-(2-methylbutoxycarbonyl)phenyl ester,
(24) 4-n-pentyl-4'-biphenylcarboxylic acid p'-(2-methylbutoxycarbonyl)phenyl ester,
(25) 4-n-hexyl-4'-biphenylcarboxylic acid p'-(2-methylbutoxycarbonyl)phenyl ester,
(26) 4-n-heptyl-4'-biphenylcarboxylic acid p'-(2-methylbutoxycarbonyl)phenyl ester,
(27) 4-n-octyl-4'-biphenylcarboxylic acid p'-(2-methylbutoxycarbonyl)phenyl ester,

(28) 4-n-nonyl-4'-biphenylcarboxylic acid p'-(2-methylbutoxycarbonyl)phenyl ester,
(29) 4-n-decyl-4'-biphenylcarboxylic acid p'-(2-methylbutoxycarbonyl)phenyl ester,
(30) 4-n-undecyl-4'-biphenylcarboxylic acid p'-(2-methylbutoxycarbonyl)phenyl ester,
(31) 4-n-dodecyl-4'-biphenylcarboxylic acid p'-(2-methylbutoxycarbonyl)phenyl ester,
(32) 4-n-tridecyl-4'-biphenylcarboxylic acid p'-(2-methylbutoxycarbonyl)phenyl ester,
(33) 4-n-tetradecyl-4'-biphenylcarboxylic acid p'-(2-methylbutoxycarbonyl)phenyl ester,
(34) 4-n-pentadecyl-4'-biphenylcarboxylic acid p'-(2-methylbutoxycarbonyl)phenyl ester,
(35) 4-n-hexadecyl-4'-biphenylcarboxylic acid p'-(2-methylbutoxycarbonyl)phenyl ester,
(36) 4-n-heptadecyl-4'-biphenylcarboxylic acid p'-(2-methylbutoxycarbonyl)phenyl ester,
(37) 4-n-octadecyl-4'-biphenylcarboxyic acid p'-(2-methylbutoxycarbonyl)phenyl ester,
(38) 4-n-nonadecyl-4'-biphenylcarboxylic acid p'-(2-methylbutoxycarbonyl)phenyl ester, and
(39) 4-n-eicosyl-4'-biphenylcarboxylic acid p'-(2-methylbutoxycarbonyl)phenyl ester.

The phase transition temperatures of the p'-(2-methylbutoxycarbonyl)phenyl esters of both 4-n-alkoxy-4'-biphenylcarboxylic and 4-n-alkyl-4'-biphenylcarboxylic acids prepared in Examples 3 and 4 are listed in Tables 3 and 4 below. As understood from these tables, these compounds show an $S_C^*$ phase in a wide temperature range. The symbols used have the same meaning as in Table 1 except for Ch. Ch stands for a cholesteric phase in Table 3 and the following Tables.

TABLE 3

| R— | Phase transition temperature (°C.) |
|---|---|
| $CH_3O-$ | C $\xrightleftharpoons{113}$ $S_A$ $\xrightleftharpoons{194}$ $C_h$ $\xrightleftharpoons{212}$ I |
| $C_4H_9O-$ | C $\xrightleftharpoons{129}$ $S_A$ $\xrightleftharpoons{209}$ I |
| $C_7H_{15}O-$ | C $\xrightleftharpoons{72}$ $S_C^*$ $\xrightleftharpoons{137}$ $S_A$ $\xrightleftharpoons{192}$ I |
| $C_8H_{17}O-$ | C $\xrightleftharpoons{64}$ $S_C^*$ $\xrightleftharpoons{139}$ $S_A$ $\xrightleftharpoons{189}$ I |
| $C_9H_{19}O-$ | C $\xrightleftharpoons{60}$ $S_C^*$ $\xrightleftharpoons{146}$ $S_A$ $\xrightleftharpoons{185}$ I |
| $C_{10}H_{21}O-$ | C $\xrightleftharpoons{55}$ $S_C^*$ $\xrightleftharpoons{126}$ $S_A$ $\xrightleftharpoons{171}$ I |
| $C_{18}H_{37}O-$ | C $\xrightleftharpoons{75}$ $S_A$ $\xrightleftharpoons{133}$ I |

TABLE 4

| R— | Phase transition temperature (°C.) |
|---|---|
| $C_3H_7-$ | C $\xrightleftharpoons{127}$ $S_A$ $\xrightleftharpoons{158}$ $C_h$ $\xrightleftharpoons{166}$ I |
| $C_5H_{11}-$ | C $\xrightleftharpoons{89}$ $S_A$ $\xrightleftharpoons{161.6}$ $C_h$ $\xrightleftharpoons{162.3}$ I |

TABLE 4-continued

| R— | Phase transition temperature (°C.) |
|---|---|
| $C_6H_{13}-$ | C $\xrightleftharpoons{68}$ $S_C^*$ $\xrightleftharpoons{86}$ $S_A$ $\xrightleftharpoons{157}$ I |
| $C_7H_{15}-$ | C $\xrightleftharpoons{62}$ $S_C^*$ $\xrightleftharpoons{90}$ $S_A$ $\xrightleftharpoons{158}$ I |
| $C_8H_{17}-$ | C $\xrightleftharpoons{67}$ $S_C^*$ $\xrightleftharpoons{101}$ $S_A$ $\xrightleftharpoons{153}$ I |
| $C_9H_{19}-$ | C $\xrightleftharpoons{53}$ $S_C^*$ $\xrightleftharpoons{100}$ $S_A$ $\xrightleftharpoons{151}$ I |
| $C_{10}H_{21}-$ | C $\xrightleftharpoons{57}$ $S_C^*$ $\xrightleftharpoons{102}$ $S_A$ $\xrightleftharpoons{148}$ I |
| $C_{12}H_{25}-$ | C $\xrightleftharpoons{42}$ $S_C^*$ $\xrightleftharpoons{81}$ $S_A$ $\xrightleftharpoons{175}$ I |

EXAMPLE 5: Synthesis of p-n-octylbenzoic acid 4'-(2-methylbutoxycarbonyl)-4-biphenylyl ester

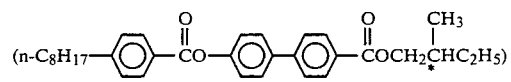

20 g of 4-hydroxy-4'-biphenylcarboxylic acid, 53 g of (−)2-methylbutanol, and 4 g of conc. sulfuric acid were refluxed for 20 minutes, admixed with 500 ml of benzene, and heated in a container provided with a Dean-Stark reflux condenser. Generated water was removed. After the reaction mother liquor was cooled and washed with water, the solvent was distilled off to obtain crude 4-hydroxy-4'-biphenylcarboxylic acid 2-methylbutyl ester. The product was recrystallized from benzene-heptane mixed solvent to obtain a purified product having a melting point of 115° to 116° C.

p-n-Octylbenzoic acid chloride prepared from 7 g of p-n-octylbenzoic acid and excess thionyl chloride was dissolved in toluene, and the solution was admixed with a pyridine solution of 8.3 g of said 4-hydroxy-4'-biphenylcarboxylic acid 2-methylbutyl ester for reaction at 80° C. for 3 hours. The crude product was obtained in the same manner as described in Example 1 and recrystallized twice from ethyl acetate to obtain p-n-octylbenzoic acid 4'-(2-methylbutoxycarbonyl)-4-biphenylyl ester.

Elementary analysis for $C_{33}H_{40}O_4$:

|  | calculated | found |
|---|---|---|
| C | 79.16% | 79.1% |
| H | 8.05% | 8.1% |

Optical rotatory power: $[\alpha]_D^{23}$ C.=+2.5° (in chloroform solution).

EXAMPLE 6

The following compounds which contain different groups from those of Example 5 as R (an alkyl or alkoxy group) of the general formula (V) can be prepared in the same manner as described in Example 5:
(1) p-methoxybenzoic acid 4'-(2-methylbutoxycarbonyl)-4-biphenylyl ester, (2) p-ethoxybenzoic acid 4'-(2-methylbutoxycarbonyl)-4-biphenylyl ester.
(3) p-n-propoxybenzoic acid 4'-(2-methylbutoxycarbonyl)-4-biphenylyl ester,
(4) p-n-butoxybenzoic acid 4'-(2-methylbutoxycarbonyl)-4-biphenylyl ester,
(5) p-n-pentyloxybenzoic acid 4'-(2-methlbutoxycarbonyl)-4-biphenylyl ester,
(6) p-n-hexyloxybenzoic acid 4'-(2-methylbutoxycarbonyl)-4-biphenylyl ester,
(7) p-n-heptyloxybenzoic acid 4'-(2-methylbutoxycarbonyl)-4-biphenylyl ester,
(8) p-n-octyloxybenzoic acid 4'-(2-methylbutoxycarbonyl)-4-biphenylyl ester,
(9) p-n-nonyloxybenzoic acid 4'-(2-methylbutoxycarbonyl)-4-biphenylyl ester,
(10) p-n-decyloxybenzoic acid 4'-(2-methylbutoxycarbonyl)-4-biphenylyl ester,
(11) p-n-undecyloxybenzoic acid 4'-(2-methylbutoxycarbonyl)-4-biphenylyl ester,
(12) p-n-dodecyloxybenzoic acid 4'-(2-methylbutoxycarbonyl)-4-biphenylyl ester,
(13) p-n-tridecyloxybenzoic acid 4'-(2-methylbutoxycarbonyl)-4-biphenylyl ester,
(14) p-n-tetradecyloxybenzoic acid 4'-(2-methylbutoxycarbonyl)-4-biphenylyl ester,
(15) p-n-pentadecyloxybenzoic acid 4'-(2-methylbutoxycarbonyl)-4-biphenylyl ester,
(16) p-n-hexadecyloxybenzoic acid 4'-(2-methylbutoxycarbonyl)-4-biphenylyl ester,
(17) p-n-heptadecyloxybenzoic acid 4'-(2-methylbutoxycarbonyl)-4-biphenylyl ester,
(18) p-n-octadecyloxybenzoic acid 4'-(2-methylbutoxycarbonyl)-4-biphenylyl ester,
(19) p-n-nonadecyloxybenzoic acid 4'-(2-methylbutoxycarbonyl)-4-biphenylyl ester,
(20) p-n-eicosyloxybenzoic acid 4'-(2-methylbutoxycarbonyl)-4-biphenylyl ester,
(21) p-methylbenzoic acid 4'-(2-methylbutoxycarbonyl)-4-biphenylyl ester,
(22) p-ethylbenzoic acid 4'-(2-methylbutoxycarbonyl)-4-biphenylyl ester,
(23) p-n-propylbenzoic acid 4'-(2-methylbutoxycarbonyl)-4-biphenylyl ester,
(24) p-n-butylbenzoic acid 4'-(2-methylbutoxycarbonyl)-4-biphenylyl ester,
(25) p-n-pentylbenzoic acid 4'-(2-methylbutoxycarbonyl)-4-biphenylyl ester,
(26) p-n-hexylbenzoic acid 4'-(2-methylbutoxycarbonyl)-4-biphenylyl ester,
(27) p-n-heptylbenzoic acid 4'-(2-methylbutoxycarbonyl)-4-biphenylyl ester,
(28) p-n-nonylbenzoic acid 4'-(2-methylbutoxycarbonyl)-4-biphenylyl ester,
(29) p-n-decylbenzoic acid 4'-(2-methylbutoxycarbonyl)-4-biphenylyl ester,
(30) p-n-undecylbenzoic acid 4'-(2-methylbutoxycarbonyl)-4-biphenylyl ester,
(31) p-n-dodecylbenzoic acid 4'-(2-methylbutoxycarbonyl)-4-biphenylyl ester,
(32) p-n-tridecylbenzoic acid 4'-(2-methylbutoxycarbonyl)-4-biphenylyl ester,
(33) p-n-tetradecylbenzoic acid 4'-(2-methylbutoxycarbonyl)-4-biphenylyl ester,
(34) p-n-pentadecylbenzoic acid 4'-(2-methylbutoxycarbonyl)-4-biphenylyl ester,
(35) p-n-hexadecylbenzoic acid 4'-(2-methylbutoxycarbonyl)-4-biphenylyl ester,
(36) p-n-heptadecylbenzoic acid 4'-(2-methylbutoxycarbonyl)-4-biphenylyl ester,
(37) p-n-octadecylbenzoic acid 4'-(2-methylbutoxycarbonyl)-4-biphenylyl ester,
(38) p-n-nonadecylbenzoic acid 4'-(2-methylbutoxycarbonyl)-4-biphenylyl ester, and
(39) p-n-eicosylbenzoic acid 4'-(2-methylbutoxycarbonyl)-4-biphenylyl ester.

The phase transition temperatures of the 4'-(2-methylbutoxycarbonyl)-4-biphenylyl esters of both p-n-alkoxybenzoic and p-n-alkylbenzoic acids prepared in Examples 5 and 6 are listed in Table 5 and 6 below. As shown in the tables, these compounds show an $S_C^*$ phase. The symbols used have the same meaning as in Table 3.

TABLE 5

| R— | Phase transition temperature (°C.) |
|---|---|
| $C_2H_5$— | $C \xrightleftharpoons{99} C_h \xrightleftharpoons{149} I$ |
| $C_3H_7$— | $C \xrightleftharpoons{94} S_A \xrightleftharpoons{114} C_h \xrightleftharpoons{157} I$ |
| $C_4H_9$— | $C \xrightleftharpoons{67} S_A \xrightleftharpoons{116} C_h \xrightleftharpoons{146} I$ |
| $C_5H_{11}$— | $C \xrightleftharpoons{72} S_A \xrightleftharpoons{128} C_h \xrightleftharpoons{150} I$ |
| $C_6H_{13}$— | $C \xrightleftharpoons{66} S_C^* \xrightleftharpoons{79} S_A \xrightleftharpoons{128} C_h \xrightleftharpoons{142} I$ |
| $C_7H_{15}$— | $C \xrightleftharpoons{53} S_C^* \xrightleftharpoons{75} S_A \xrightleftharpoons{134} C_h \xrightleftharpoons{143} I$ |
| $C_8H_{17}$— | $C \xrightleftharpoons{57} S_C^* \xrightleftharpoons{89} S_A \xrightleftharpoons{134} C_h \xrightleftharpoons{140} I$ |

TABLE 6

| R— | Phase transition temperature (°C.) |
|---|---|
| $C_2H_5O$— | $C \xrightleftharpoons{110} S_A \xrightleftharpoons{140} C_h \xrightleftharpoons{203} I$ |
| $C_3H_7O$— | $C \xrightleftharpoons{107} S_A \xrightleftharpoons{145} C_h \xrightleftharpoons{185} I$ |
| $C_4H_9O$— | $C \xrightleftharpoons{91} S_A \xrightleftharpoons{159} C_h \xrightleftharpoons{185} I$ |
| $C_5H_{11}O$— | $C \xrightleftharpoons{90} S_C^* \xrightleftharpoons{101} S_A \xrightleftharpoons{157} C_h \xrightleftharpoons{177} I$ |
| $C_6H_{13}O$— | $C \xrightleftharpoons{80} S_C^* \xrightleftharpoons{106} S_A \xrightleftharpoons{162} C_h \xrightleftharpoons{177} I$ |
| $C_7H_{15}O$— | $C \xrightleftharpoons{69} S_C^* \xrightleftharpoons{119} S_A \xrightleftharpoons{163} C_h \xrightleftharpoons{172} I$ |
| $C_8H_{17}O$— | $C \xrightleftharpoons{80} S_C^* \xrightleftharpoons{121} S_A \xrightleftharpoons{165} C_h \xrightleftharpoons{171} I$ |

EXAMPLE 7

The phase transition of a mixed composition in an equivalent molar ratio of p-(2-methylbutoxycarbonyl)-phenyl ester of 4-octyloxybiphenylcarboxylic acid (the compound in Table 3, wherein R— is $C_8H_{17}O$—) and that of 4-heptylbiphenylcarboxylic acid (the compound in Table 4, wherein R— is $C_7H_{15}$—) was effected from the crystal phase to an $S_C*$ phase at 50° C., from the $S_C*$ phase to a smectic A phase at 111° C., and from the smectic A phase to a liquid phase at 175° C.

EXAMPLE 8

The phase transition of a mixture in an equivalent molar ratio of p-n-octyloxybenzoic acid p'-(2-methylbutoxycarbonyl)phenyl ester (the compound in Table 2, wherein R— is $C_8H_{17}O$—) and 2-methylbutyl p-decyloxybenzylidene-p'-amino cinnamate (a known compound, No. 1 in Table 1) was effected from the crystal phase to an $S_C*$ phase at 23° C., from the $S_C*$ phase to a smectic A phase at 42° C., and from the smectic A phase to a liquid phase at 85° C. The compounds of the present invention can thus expand the temperature range of ferroelectricity by incorporating them into conventional ferroelectric liquid crystal compounds.

EXAMPLE 9: Synthesis of 4-octyloxy-4'-biphenylcarboxylic acid 2-methylbutyl ester

20 g of 5-octyloxy-4'-biphenylcarboxylic acid and 50 ml of thionyl chloride were heated under reflux for 2 hours. Excess thionyl chloride was distilled off to obtain 4-octyloxy-4'-biphenylcarboxylic acid chloride. The obtained product need not be purified for use in the next step as a toluene solution.

On the other hand, 16 g of (−)2-methyl-1-butanol (manufactured by Eastman Kodak Co.) was dissolved in 50 g of pyridine and cooled with water. A toluene solution of said acid chloride was admixed therewith under stirring for about 30 minutes, and continuously stirred for 30 minutes in a hot-water bath at 90° C. The solution was cooled and thereafter acidified with 6N hydrochloric acid and ice. Then an organic layer was separated, washed with water, then with a 2N sodium hydroxide solution, and again with water, and distilled of toluene to obtain a product (crude). The product was dissolved in approximately 70 ml of heptane, passed through an alumina/heptane chromatography column, and recrystallized twice from ethanol to obtain 18.0 g of colorless needle crystals. The NMR spectrum and the elemental analysis values of the crystals confirmed that the obtained crystals were the desired product, namely, 4-octyloxy-4'-biphenylcarboxylic acid 2-methylbutyl ester. The optical rotatory power in a chloroform solution $[\alpha]_D^{24}$ was +3.5°. The phase transition temperatures are as listed in Table 7 with those of other compounds represented by formula (IX).

4-Octyloxy-4'-biphenylcarboxylic acid as the starting material is a known substance which is prepared by the alkaline hydrolysis of commercially available 4-octyloxy-4'-cyanobiphenyl (M-24, manufactured by BDH Co.).

The relationship between the temperatures and spontaneous polarization values of 4-octyloxy-4'-biphenylcarboxylic acid 2-methylbutyl ester is as illustrated by Curve A in FIG. 1. The relationship between the temperatures and spontaneous polarization values of 4-heptyloxy-4'-biphenylcarboxylic acid 2-methylbutyl ester, a compound of the same series, is as illustrated by Curve B in FIG. 1.

TABLE 7

| R— | Phase transition temperature (°C.) |
|---|---|
| $CH_3O$— | C $\overset{57.0}{\rightleftarrows}$ I |
| $C_4H_9O$— | C $\overset{55.5}{\rightleftarrows}$ S** $\overset{73.8}{\rightleftarrows}$ I |
| $C_5H_{11}O$— | C $\overset{57.5}{\rightleftarrows}$ $S_A$ $\overset{65.3}{\rightleftarrows}$ I |
| $C_6H_{13}O$— | C $\overset{48}{\rightleftarrows}$ $S_A$ $\overset{66}{\rightleftarrows}$ I |
| $C_7H_{15}O$— | C $\overset{41.5}{\rightleftarrows}$ $S_C*$ $\overset{43}{\rightleftarrows}$ $S_A$ $\overset{64.2}{\rightleftarrows}$ I |
| $C_8H_{17}O$— | C $\overset{48.5}{\rightarrow}$ $S_A$ $\overset{65.5}{\rightleftarrows}$ I ; $S_{C*}$ ↙ 44 |
| $C_9H_{19}O$— | C $\overset{60.0}{\rightarrow}$ $S_A$ $\overset{64.4}{\rightleftarrows}$ I ; $S_{C*}$ ↙ 38 |
| $C_{10}H_{21}O$— | C $\overset{48.5}{\rightarrow}$ $S_A$ $\overset{64.9}{\rightleftarrows}$ I ; $S_{C*}$ ↙ 42 |
| $C_{12}H_{25}O$— | C $\overset{53.2}{\rightarrow}$ $S_A$ $\overset{63.8}{\rightleftarrows}$ I ; $S_{C*}$ ↙ 39 |
| $C_{14}H_{29}O$— | C $\overset{61.1}{\rightleftarrows}$ $S_A$ $\overset{61.7}{\rightleftarrows}$ I |
| $C_{18}H_{37}O$— | C $\overset{71.2}{\rightleftarrows}$ I |

Note:
**The presence of an unindentified smectic phase is indicated.

Among the compounds listed in Table 7, those in which n is within the range of 7 to 12 show an $S_C*$ phase by themselves, while other compounds were crystallized during the measurement of the phase transition and not detected to show any $S_C*$ phase as a single compound.

EXAMPLE 10: Synthesis of 4-octyloxy-4'-biphenylcarboxylic acid 2-octyl ester

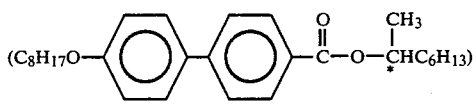

4-Octyloxy-4'-biphenylcarboxylic acid chloride was prepared in the same manner as described in Example 9. A toluene solution dissolving 9.8 g of said acid chloride was dropped under stirring into a water-cooled solution of 10 g of (−)2-octyl alcohol (manufactured by Fulka AG, Chemisch Fabrik) dissolved in 40 ml of pyridine, and further stirred in a hot-water bath at 90° C. for 3 hours. The solution was cooled, and thereafter acidified with 6N hydrochloric acid. The organic layer was separated, washed with water, then with a 2N sodium hydroxide solution, and again with water, and distilled of toluene to obtain the desired residue, which was recrystallized twice from ethanol to obtain 17.2 g of flaky crystals. The melting point of the crystal was 74.5° to 75° C. The NMR spectrum and the elemental analysis values were consistent with the chemical structure of the desired product. The optical rotatory power $[\alpha]_D^{24}$ in a chloroform solution was −33.2°.

An enantiomer of the same substance was obtained in the same method except for using (+)2-octyl alcohol (manufactured by Fulka AG, Chemische Fabrik) in place of (−)2-octyl alcohol. The melting point of the enantiomer was 74.5° to 75° C., and the optical rotatory power $[\alpha]_D^{24}$ was +33.0° (in chloroform solution).

4-Pentyloxy-4'-biphenylcarboxylic acid 2-octyl ester was obtained from 4-pentyloxy-4'-biphenylcarboxylic acid chloride and (−)2-octyl alcohol in the same manner. The melting point of the product was 61.8° C.

EXAMPLE 11

A mixture in an equivalent molar ratio of 4-heptyloxy-4'-biphenylcarboxylic acid 2-methylbutyl ester and 4-octyloxy-4'-biphenylcarboxylic acid 2-methylbutyl ester (both are compounds represented by formula (IX) in Table 7) had a melting point (C-$S_C^*$ point: the transition point from a crystal phase to a chiral smectic C phase; the same applies hereinbelow) of 33° C.; an $S_C^*$-$S_A$ point of 42.2° C.; and an $S_A$-I point of 65° C., which shows that the mixture has characteristics more suitable for display elements than a single compound.

EXAMPLE 12

A mixture of the compounds of formula (IX), wherein R is each $C_7H_{15}O-$, $C_8H_{17}O-$, $C_9H_{19}O-$, $C_{10}H_{21}O-$ and $C_{12}H_{25}O-$ and R* is

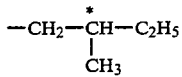

(all listed in Table 7), the weight ratio being 14:11:6:10:9, had an $S_C^*$ point of 34.6° C., and an $S_A$-I point of 63.2° C., which shows that the mixture has characteristics suitable for display elements.

EXAMPLE 13

A mixture in an equivalent molar ratio of 4-octyloxy-4'-biphenylcarboxylic acid 2-methylbutyl ester (in Table 7) and p-octyloxybenzylidene-p'-(2-methylbutyloxycarbonyl)aniline described below had phase transition points including a C-$S_C^*$ point of 20° to 21° C., and $S_C^*$-$S_A$ point of 33.6° C., and an $S_A$-I point of 62° C. The spontaneous polarization values of the mixture is as illustrated by Curve C in FIG. 1.

EXAMPLE 14: Synthesis of p-n-decyloxybenzylidene-p'-(2-methylbutyloxycarbonyl)aniline

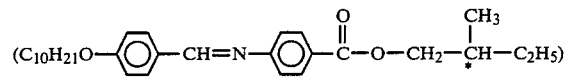

A mixed solution of 51 g of (−)2-methylbutyl alcohol and 200 ml of pyridine was cooled with ice, admixed with p-nitrobenzoic acid chloride under stirring for 30 minutes, and further stirred under heating in a water bath for 5 hours. After it was cooled to room temperature, 400 ml of water and 200 ml of toluene were added thereto and an organic layer was separated and washed successively with 6N hydrochloric acid, 2N sodium hydroxide and water, yielding by vacuum distillation 97.5 g of yellow oil having a boiling point of 134° to 137° C. (4 mm Hg). The obtained product was p-nitrobenzoic acid 2-methylbutyl ester.

The obtained nitro compound was reduced with hydrogen in 260 ml of ethanol at room temperature an atmospheric pressure, in the presence of 6 g of 5% Pd/C catalyst. The catalyst was separated by filtration and ethanol was distilled off. The obtained crystals were recrystallized from a mixed solvent of 200 ml of heptane and 100 ml of benzene to obtain 85 g of crystals having a melting point of 44° to 45° C. The obtained product was (+)p-aminobenzoic acid 2-methylbutyl ester. As a result of the measurement with a 20% toluene solution, the optical rotatory power $[\alpha]_D^{23}$ was found to be +7.30.

p-n-Decyloxybenzaldehyde, another material, was prepared by the following method: 84 g of p-hydroxybenzaldehyde, 400 ml of ethanol, 48 g of potassium hydroxide, and 170 g of n-decyl bromide were heated under stirring under reflux for 5 hours. Most of ethanol was then distilled off. After the addition of toluene and water, the organic layer was separated, washed with 2N sodium hydroxide and then with water, and thereafter distilled in vacuum to obtain 127 g of the desired product having a boiling point of 157° to 159° C. (3 mmHg).

8 g of (+)-p-aminobenzoic acid 2-methylbutyl ester, 10 g of p-n-decyloxybenzaldehyde, 20 mg of p-toluenesulfonic acid, and 150 ml of toluene were boiled in a container provided with a Dean-Stark reflux condenser to remove generated water. The solution was cooled to room temperature, washed with 2N sodium hydroxide and then with water, and distilled of toluene in vacuum. The obtained residue was recrystallized twice from ehtanol, yielding 11 g p-n-decyloxybenzylidene-p'-(2-methylbutyloxycarbonyl)aniline.

Figure 2:
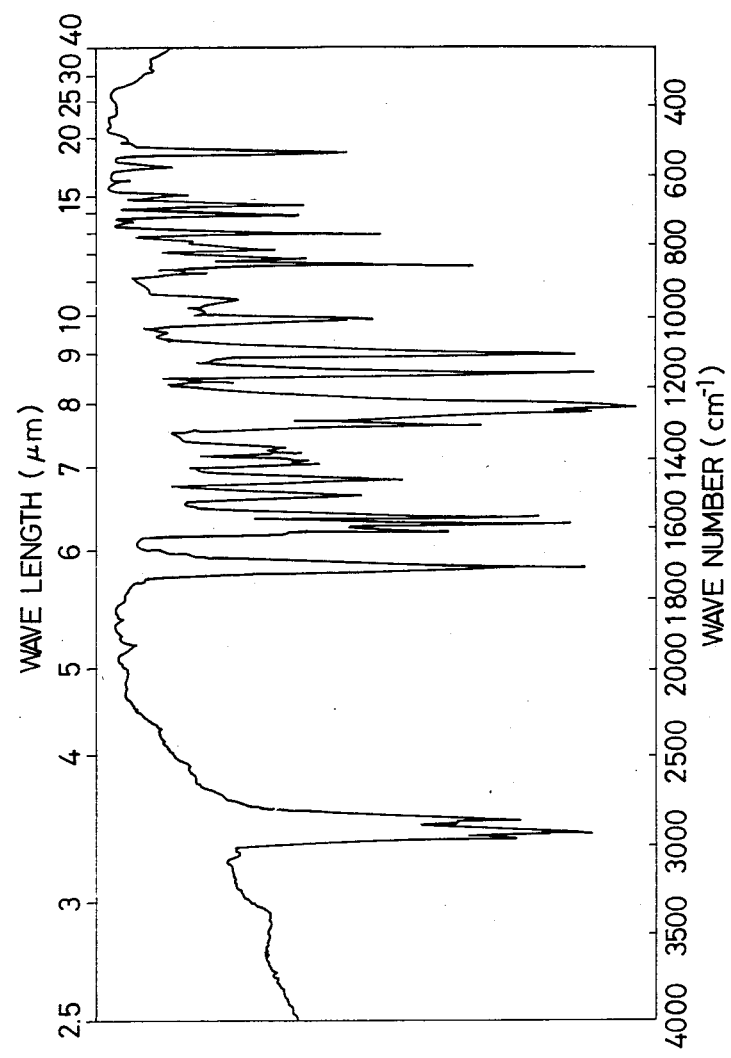
FIG. 2 is an infrared absorption spectrum of the liquid crystal compounds of the present invention prepared according to the methods described in the examples.

It was confirmed that the obtained substance was p-n-decyloxybenzylidene-p'-(2-methylbutyloxycarbonyl)aniline by elemental analysis, mass spectrum, and infrared absorption spectrum. More precisely, the elemental analysis values of the present substance (C: 77.13%, H: 9.18%, N: 3.08%) were consistent with those calculated based on the molecular formula of $C_{29}H_{41}NO_3$ (C: 77.13%, H: 9.15%, N: 3.10%). In the mass spectrum, the molecular ion peak appeared at m/e=451. As shown in FIG. 2 illustrating the infrared spectrum of the present substance, the absorption of the ester linkage appeared at 1710 cm$^{-1}$ and 1255 cm$^{-1}$ and that of the Schiff linkage at 1610 cm$^{-1}$. The present compound was confirmed to be p-n-decyloxybenzylidene-p'-(2-methylbutyloxycarbonyl)aniline based on the relationship between the above results of the analysis and the starting compounds.

EXAMPLE 15

The phase transition temperatures of p-n-alkoxybenzylidene-p'-(2methylbutoxycarbonyl)anilines synthesized by the method according to the process described in Example 14 are listed in Table 8.

TABLE 8

| R— | Phase transition temperature (°C.) |
|---|---|
| $C_4H_9O-$ | C ⇌60⇌ $S_A$ ⇌63⇌ I |
| $C_5H_{11}O-$ | C ⇌46⇌ $S_A$ ⇌58⇌ I |
| $C_6H_{13}O-$ | C ⇌46⇌ $S_A$ ⇌61⇌ I |
| $C_7H_{15}O-$ | C ⇌46⇌ $S_A$ ⇌61⇌ I; $S_C^*$ /35 |
| $C_8H_{17}O-$ | C ⇌41⇌ $S_A$ ⇌66⇌ I; $S_C^*$ /39 |
| $C_9H_{19}O-$ | C ⇌60⇌ $S_A$ ⇌66⇌ I; $S_C^*$ /42 |
| $C_{10}H_{21}O-$ | C ⇌52⇌ $S_A$ ⇌68⇌ I; $S_C^*$ /42 |
| $C_{11}H_{23}O-$ | C ⇌53⇌ $S_A$ ⇌67⇌ I; $S_C^*$ /42 |
| $C_{12}H_{25}O-$ | C ⇌48⇌ $S_A$ ⇌69⇌ I; $S_C^*$ /41 |
| $C_{14}H_{29}O-$ | C ⇌54⇌ $S_A$ ⇌68⇌ I; $S_C^*$ /37 |
| $C_{16}H_{33}O-$ | C ⇌55⇌ $S_A$ ⇌67⇌ I |

TABLE 8-continued

| R— | Phase transition temperature (°C.) |
|---|---|
| $C_{18}H_{37}O-$ | C ⇌64⇌ $S_A$ ⇌66⇌ I |

Figure 3:
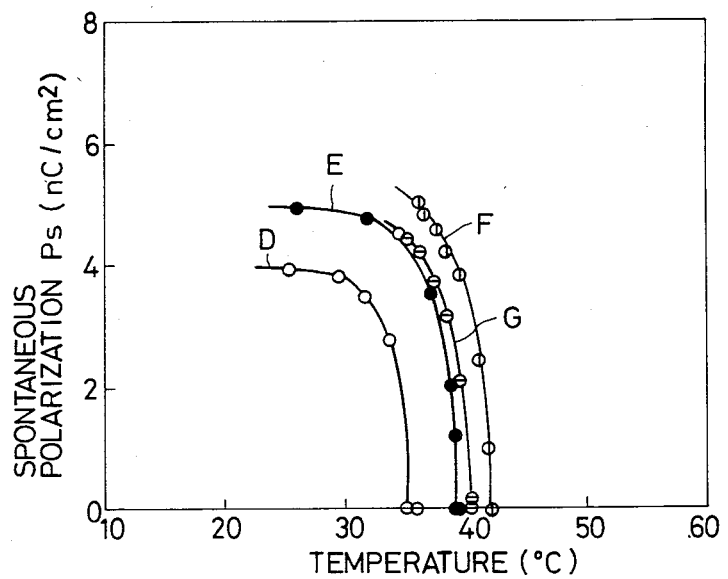

As understood from Table 8, the phase transition of the compounds in which R contains 4 to 12 carbon atoms is monotropic showing a smectic chiral C phase. These compounds were confirmed to show ferroelectricity in this phase. The relationship between the temperatures and the degree of spontaneous polarization of the compounds of the present example is as illustrated in FIG. 3, in which Curve D is related to the compound in which R is $C_7H_{15}O-$, Curve E to that in which R is $C_8H_{17}O-$, Curve F to that in which R is $C_{10}H_{21}O-$, and Curve G to that in which R is $C_{12}H_{25}O-$.

The following experiment was made to examine the optical stability of the compounds of the present example. The sample was introduced into a 2φ capillary tube and observed for changes in the temperature of phase transition ($T_{SA}=I$) from a smectic A phase to an isotropic phase when the sample was irradiated with a weather-meter. The weather-meter used was of a WE-SUN-DC type manufactured by Suga Shikenki Co. and the light source was carbon arc. p-n-Octyloxybenzylidene-p'-(2-methylbutoxycarbonyl)aniline (R=$C_8H_{17}O-$) was selected as a sample from the compounds of the present Example. 2-Methylbutyl p-decyloxybenzylidene-p'-amino cinnamate in Table 1 was also subjected to the examination as a referential sample. The relationship between the measured $T_{SA}$-I an irradiation time is summarized in Table 9.

TABLE 9

| | Irradiation time (h) | 0 | 10 | 30 |
|---|---|---|---|---|
| $T_{SA}$-I (°C.) | Example (R = $C_8H_{17}O-$) | 66 | 66 | 66 |
| | Referential example | 117 | 102 | 85 |

The phase transition temperature of the referential sample was lowered by 30° C. or more by irradiation for 30 hours, while substantially no change was observed in the sample of the present Example. It is thus understood that the sample of the present Example is optically stable.

EXAMPLE 16: Synthesis
p-n-octylbenzylidene-p'-(2-methylbutyloxycarbonyl)aniline

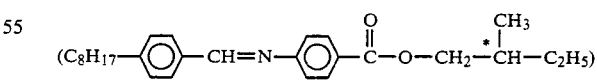

7 g of the (+)p-aminobenzoic acid 2-methylbutyl ester synthesized by the method described in Example 14, 9 g of p-n-octylbenzaldehyde, 18 mg of p-toluenesulfonic acid, and 135 ml of toluene were boiled in a container provided with a Dean-Stark reflux condenser in the same manner as in Example 14, and generated water was removed. The solution was cooled to room temperature, washed with 2N sodium hydroxide and then with water, and distilled of toluene in vacuum. The obtained residue was recrystallized twice from ethanol, yielding 10 g of p-n-octylbenzylidene-p'-(2-methylbutyloxycarbonyl)aniline.

The elemental analysis values of the substance thus obtained (C: 79.61%, H: 9.15%, N: 3.40%) were consistent with the values calculated based on the molecular formula of $C_{27}H_{37}NO_2$ (C: 79.55%, H: 9.17%, N: 3.44%). In the mass spectrum, the molecular ion peak appeared at m/e=407. In the infrared absorption spectrum, the absorption of the ester linkage appeared at 1710 cm$^{-1}$ and 1260 cm$^{-1}$, and that of the azomethine linkage at 1610 cm$^{-1}$. The present compound was confirmed to be p-n-octylbenzylidene-p'-(2-methylbutyloxycarbonyl)aniline based on the above facts and the starting compounds.

The obtained substance had a melting point (m.p.) of 12° C. and showed no liquid crystal phases. As compared with Example 14, an alkyl group is considered to have more difficulties in the transition to a liquid crystal phase than an alkoxy group. It is preferred to use an alkoxy group (Example 14) to expect a liquid crystal phase.

EXAMPLE 17: Synthesis of p-n-alkyloxybenzylidene-p'-(1-methylheptyloxycarbonyl)aniline

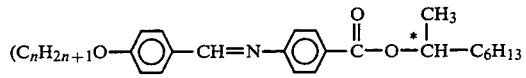

(+)p-Aminobenzoic acid 2-octyl ester (m.p. 72.5°–73.5° C.) synthesized from 2-octanol according to the method described in Example 14 and p-n-alkyloxybenzaldehyde synthesized by the method described in Examples 14 and 15 were used as starting materials to obtain desired p-n-alkyloxybenzylidene-p'-(1-methylheptyloxycarbonyl)aniline. The process for the preparation was the same as described in Examples 14, 15 or 16.

The obtained substance was confirmed to be the desired compound based on the results of the examinations conducted in the same manner as in Examples 14, 15, and 16: for example, p-n-butyloxybenzylidene-p'-(1-methylheptyloxycarbonyl)aniline, the compound wherein n in the general formula is 4, the elemental analysis values (C: 76.29%, H: 8.59%, N: 3.38%) were consistent with the values calculated based on the molecular formula of $C_{26}H_{35}NO_3$ (C: 76.23%, H: 8.63%, N: 3.42%); in the mass spectrum the molecular ion peak appeared at m/e=409; and in the infrared absorption spectrum, the absorption of the ester linkage appeared at 1700 cm$^{-1}$ and 1265 cm$^{-1}$ and that of the azomethine linkage at 1620 cm$^{-1}$.

The phase transition temperatures of the compounds of the present Example in which n is 4 and 8 are shown in Table 10.

TABLE 10

| n | C-I (°C.) | $S_A$-I (°C.) |
|---|---|---|
| 4 | 39 | (30) |
| 8 | 50 | — |

As shown in the above Examples 16 and 17, the compounds of Examples 16 and 17 cannot easily show a ferroelectric liquid crystal phase by themselves, while the compound of Example 14 shows ferroelectricity by itself. However, in case these compound are incorporated into conventional ferroelectric liquid crystal compounds, the mixture is enabled to show ferroelectricity at a temperature as low as room temperature, or endowed with optical stability. It is thus understood that they are useful compounds as formulation ingredients.

EXAMPLE 18

Liquid crystal compositions were prepared using as ingredients the compounds obtained in Example 15. The formulation and the phase transition temperatures of these liquid crystal compositions are shown in Table 11. As understood from this table, the liquid crystal composition A according to the present Example shows a stable enantiotropic ferroelectric smectic chiral C phase around room temperature. The liquid crystal composition B, in which the liquid crystal compound of Example 15 is mixed with a conventional ferroelectric liquid compound, shows ferroelectricity in temperatures ranging from 30° to 61° C. It is understood that the liquid crystal compound of Example 15 is effective in lowering the temperature range of ferroelectricity to around room temperature.

TABLE 11

| | Liquid crystal composition (% by weight) | C—S | $S_C^*$—$S_A$ | |
|---|---|---|---|---|
| A | $C_7H_{15}O$—⌬—CH=N—⌬—C(=O)—O—CH$_2$—*CH(CH$_3$)—C$_2$H$_5$ | (30) | 27 | 28 |
| | $C_8H_{17}O$—⌬—CH=N—⌬—C(=O)—O—CH$_2$—*CH(CH$_3$)—C$_2$H$_5$ | (40) | | |
| | $C_{12}H_{17}O$—⌬—CH=N—⌬—C(=O)—O—CH$_2$—*CH(CH$_3$)—C$_2$H$_5$ | (30) | | |
| B | $C_8H_{17}O$—⌬—CH=N—⌬—C(=O)—O—CH$_2$—*CH(CH$_3$)—C$_2$H$_5$ | (50) | 30 | 61 |

TABLE 11-continued

| Liquid crystal composition (% by weight) | C—S | S_C*—S_A |
|---|---|---|

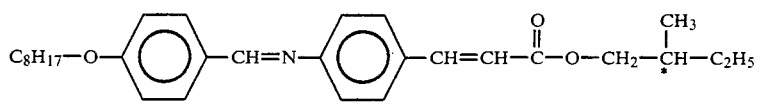
(50)

EXAMPLE 19: Synthesis of p-n-tetradecyloxy-4-(2-methylbutoxycarbonyl)benzylideneaniline

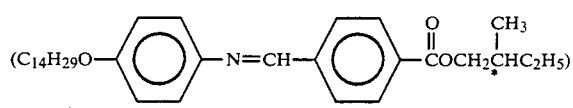

The title substance was synthesized as follows: 300 ml of thionyl chloride was dropped into a mixture of 358 g of commercially available terephthalaldehydic acid with 700 ml of toluene and 2 g of pyridine, and the solution was heated under reflux slowly until a homogeneous reaction solution was obtained. After the solution was cooled to room temperature, unreacted thionyl chloride and toluene as a solvent were distilled off in vacuum. Terephthalaldehydic acid chloride (b.p. 133°–135° C./15 Torr) was obtained by the vacuum distillation of the remaining reaction product.

315 g of said terephthalaldehydic acid chloride dissolved in 400 ml of toluene was dropped into an ice-cooled mixed solution of commercially available S(—)-2-methylbutanol (optically active amyl alcohol) and 230 g of pyridine, and heated under reflux for 2 hours. The reaction solution was cooled to room temperature and further cooled with ice, and acidified by adding 6N hydrochloric acid thereto to remove pyridine in the organic layer. The organic layer was then washed successively with water, 2N aqueous sodium hydroxide solution, and again with water. Toluene as a solvent was distilled off in vacuum, and the remaining reaction product was distilled in vacuum to obtain p-(2-methylbutoxycarbonyl)benzaldehyde (b.p. 118°–124° C./3.5 Torr).

On the other hand, p-n-tetradecyloxyaniline (m.p. 101° C.) was obtained by reducing p-n-tetradecyloxynitrobenzene with hydrogen in ethanol in the presence of a Pd/C catalyst.

44.3 g of said p-(2-methylbutoxycarbonyl)benzaldehyde, 32 g of p-n-tetradecyloxyaniline, and 0.1 g of p-toluenesulfonic acid were dissolved in toluene. The solution was heated under reflux, and water generated in the dehydrating condensation was removed with a Dean-Stark condenser. After the reaction solution was cooled, the organic layer was washed with water, and the solvent (toluene) was distilled off in vacuum. The solid residue was recrystallized from ethanol to obtain yellow crystals.

Elemental analysis for $C_{33}H_{49}NO_3$:

|   | calculated | found |
|---|---|---|
| C | 78.06% | 77.8% |
| H | 9.73% | 9.8% |

EXAMPLE 20: Synthesis of p-(2-methylbutoxycarbonyl)benzylidene-p'-n-decylaniline

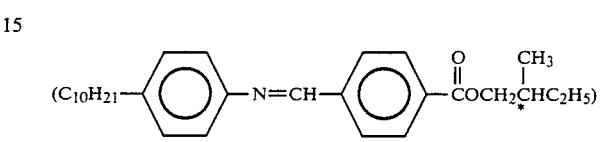

The product was synthesized by the dehydrating condensation of 7 g of p-(2-methylbutoxycarbonyl)benzaldehyde described in Example 19 and 7.4 g of commercially available p-n-decylaniline in the same manner as described in Example 19.

Elemental analysis for $C_{29}H_{41}NO_2$:

|   | calculated | found |
|---|---|---|
| C | 79.95% | 79.8% |
| H | 9.49% | 9.5% |

EXAMPLE 21

The following compounds can be synthesized by the same method as described in Example 19:
(1) p-methoxy-4-(2-methylbutoxycarbonyl)benzylideneaniline,
(2) p-ethyoxy-4-(2-methylbutoxycarbonyl)benzylideneaniline,
(3) p-n-propoxy-4-(2-methylbutoxycarbonyl)benzylideneaniline,
(4) p-n-butoxy-4-(2-methylbutoxycarbonyl)benzylideneaniline,
(5) p-n-pentyloxy-4-(2-methylbutoxycarbonyl)benzylideneaniline,
(6) p-n-hexyloxy-4-(2-methylbutoxycarbonyl)benzylideneaniline,
(7) p-n-octyloxy-4-(2-methylbutoxycarbonyl)benzylideneaniline,
(8) p-n-nonyloxy-4-(2-methylbutoxycarbonyl)benzylideneaniline,
(9) p-n-decyloxy-4-(2-methylbutoxycarbonyl)benzylideneaniline,
(10) p-n-undecyloxy-4-(2-methylbutoxycarbonyl)benzylideneaniline,
(11) p-n-dodecyloxy-4-(2-methylbutoxycarbonyl)benzylideneaniline,
(12) p-n-tridecyloxy-4-(2-methylbutoxycarbonyl)benzylideneaniline,
(13) p-n-tetradecyloxy-4-(2-methylbutoxycarbonyl)benzylideneaniline,
(14) p-n-pentadecyloxy-4-(2-methylbutoxycarbonyl)benzylideneaniline,
(15) p-n-hexadecyloxy-4-(2-methylbutoxycarbonyl)benzylideneaniline,
(16) p-n-heptadecyloxy-4-(2-methylbutoxycarbonyl)benzylideneaniline,

(17) p-n-octadecyloxy-4-(2-methylbutoxycarbonyl)benzylideneaniline,
(18) p-n-nonadecyloxy-4-(2-methylbutoxycarbonyl)-benzylideneaniline, and
(19) p-n-eicosyloxy-4-(2-methylbutoxycarbonyl)benzylideneaniline.

EXAMPLE 22

Synthesis of S-p-(2-methylbutyloxycarbonyl)benzylidene-4-(4'-n-octyloxyphenyl)aniline

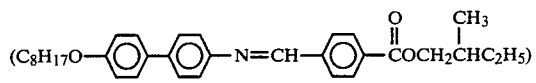

4'-n-Octyloxy-4-nitrobiphenyl, a known substance, was reduced with hydrogen in an ethyl acetate solution using a Pd/C catalyst and recrystallized from ethanol to obtain 4'-n-octyloxy-4-aminobiphenyl. 3 g of the obtained product was reacted with 2.2 g S-p-(2-methylbutyloxycarbonyl)benzaldehyde in the same manner as described in Example 19 and recrystallized from ethyl acetate to obtain bright yellow crystals.
Elemental analysis for $C_{33}H_{41}NO_3$:

|   | calculated | found |
|---|---|---|
| C | 79.32% | 79.2% |
| H | 8.27% | 8.3% |

EXAMPLE 23

Synthesis of S-p-(2-methylbutyloxycarbonyl)benzylidene-4-(4'-n-heptylphenyl)aniline

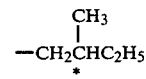

4'-n-Heptyl-4-aminobiphenyl was synthesized by the Hofmann degradation of 4'-n-heptyl-4-biphenylcarboxylic acid made (m.p. 79° C.). 4.1 g of this substance and 3.3 g of S-p-(2-methylbutyloxycarbonyl)benzaldehyde were subjected to dehydrating condensation in the same manner as described in Example 19 and recrystallized from ethanol to obtain the title compound.
Elemental analysis for $C_{32}H_{39}NO_2$:

|   | calculated | found |
|---|---|---|
| C | 31.83% | 81.5% |
| H | 8.37% | 8.5% |

The compounds wherein n stands for 1 and R* for $$-CH_2\overset{CH_3}{\underset{*}{C}H}C_2H_5$$

in the general formula (XI) were prepared according to the above method. The phase transition temperatures of these compounds are listed in Table 12 below:

TABLE 12

| R | m | Phase transition temperature °C. |
|---|---|---|
| $C_{10}H_{21}-$ | 1 | C $\underset{\longrightarrow}{\overset{16.8}{\longleftarrow}}$ $S_A$ $\underset{\longrightarrow}{\overset{28.3}{\longleftarrow}}$ I |
| $C_5H_{11}O-$ | 1 | C $\underset{\longrightarrow}{\overset{53.8}{\longleftarrow}}$ $S_A$ $\underset{\longrightarrow}{\overset{63.4}{\longleftarrow}}$ I |
| $C_7H_{15}O-$ | 1 | C $\overset{51.2}{\longrightarrow}$ $S_A$ $\underset{\longrightarrow}{\overset{90.2}{\longleftarrow}}$ I; ↙46.4 $S_c*$ |
| $C_8H_{17}O-$ | 1 | C $\overset{52.9}{\longrightarrow}$ $S_A$ $\overset{73.8}{\longrightarrow}$ I; ↙48.8 $S_c*$ |
| $C_9H_{19}O-$ | 1 | C $\overset{80.8}{\longrightarrow}$ I; ↙73.0 $S_A$ |
| $C_{14}H_{29}O-$ | 1 | C $\overset{59.3}{\longrightarrow}$ $S_A$ $\underset{\longrightarrow}{\overset{73.0}{\longleftarrow}}$ I; ↙50.8 $S_c*$ |
| $C_5H_{11}-$ | 2 | C $\underset{\longrightarrow}{\overset{79.3}{\longleftarrow}}$ $S_E$ $\underset{\longrightarrow}{\overset{(1)112.3}{\longleftarrow}}$ $S_B$ $\underset{\longrightarrow}{\overset{(2)138.5}{\longleftarrow}}$ $S_A$ $\underset{\longrightarrow}{\overset{196.3}{\longleftarrow}}$ I |

TABLE 12-continued

| R | m | Phase transition temperature °C. |
|---|---|---|
| $C_7H_{15}-$ | 2 | $C \xrightarrow{78.5} S_B \xrightleftharpoons[]{122.2} S_C \xrightleftharpoons[]{133.3} S_A \xrightleftharpoons[]{185.5} I$ ; $S_B \xrightarrow{78.0} S_E$ |
| $C_8H_{17}O-$ | 2 | $C \xrightleftharpoons[]{84.3} S^{(3)} \xrightleftharpoons[]{111.5} S_H \xrightleftharpoons[]{129.2} S_C \xrightleftharpoons[]{176.6} S_A \xrightleftharpoons[]{210.5} I$ |

Note:
(1) indicating a smectic E phase
(2) indicating a smectic B phase
(3) indicating an unidentified smectic phase

EXAMPLE 24

Synthesis of 4'-n-decyloxy-4-biphenylyl S-p-(2-methylbutoxycarbonyl)benzoate

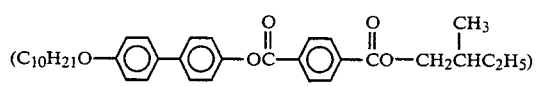

4'-n-Decyloxy-4-hydroxybiphenyl was synthesized by monoalkylating commercially available 4,4'-dihydroxybiphenyl in the presence of an equivalent amount of n-decyl p-toluenesulfonate and an akali (m.p. 149° C.).

S-p-(2-methylbutyloxycarbonyl)benzoic acid was obtained by dissolving 113 g of S-p-(2-methylbutyloxycarbonyl)benzaldehyde described in Example 23 in 250 ml of acetic acid; dropping a solution consisting of 70 g of chromic anhydride, 150 ml of acetic acid, and 20 ml of water into the above solution under stirring for about 3 hours, the temperature of the liquid being maintained at 20° C. or below during the dropping; further stirring for 1 hour at 30° C., adding 250 ml of water; collecting the obtained crystals by suction filtration; and recrystallizing the crystals twice from ethanol. The amount of the obtained substituted benzoic acid was 78 g and the melting point was 158° to 160° C.

12 g of this acid was heated under reflux with 15 ml of oxalyl chloride and 25 ml of toluene for 3 hours, and excess oxalyl chloride and toluene were distilled off in vacuum to obtain S-p-(2-methylbutyloxycarbonyl)benzoyl chloride. The obtained substance was used in the next step without purification. The obtained distillation residue was dissolved in 50 ml of toluene. The solution was dropped into an ice-cooled solution wherein 15 g of 4'-n-decyloxy-4-hydroxybiphenyl was dissolved in 80 ml of anhydrous pyridine under stirring and reaction was proceeded at 80° C. for 2 hours. The product was collected by the ordinary method and recrystallized twice from ethyl acetate to obtain colorless crystals. The phase transition temperatures of this product and the compounds prepared according to this method are listed in Table 13. These compounds are those in which n stands for 1 and R* for

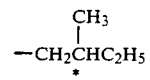

in the general formula (VI), R and m standing for various groups and numbers.

TABLE 13

| R | m | Phase transition temperature °C. |
|---|---|---|
| $C_8H_{17}O-$ | 1 | $C \xrightarrow{47.8} I$ ; $C \xrightarrow{44.3} Ch$ |
| $C_{12}H_{25}O-$ | 1 | $C \xrightleftharpoons[]{56.5} I$ |
| $C_8H_{17}-$ | 1 | $C \xrightleftharpoons[]{28.5} I$ |
| $C_6H_{13}O-$ | 2 | $C \xrightleftharpoons[]{94} S_E \xrightleftharpoons[]{121.3} S_B \xrightleftharpoons[]{125.6} S_A \xrightleftharpoons[]{165.9} Ch \xrightleftharpoons[]{177.5} I$ |
| $C_8H_{17}O-$ | 2 | $C \xrightleftharpoons[]{85.3} S_E \xrightleftharpoons[]{102.0} S_B \xrightleftharpoons[]{119.0} S_C^* \xrightleftharpoons[]{126.9} S_A \xrightleftharpoons[]{162.9} Ch \xrightleftharpoons[]{170.4} I$ |
| $C_{10}H_{21}O-$ | 2 | $C \xrightleftharpoons[]{85.5} S_B \xrightleftharpoons[]{97.9} S_C^* \xrightleftharpoons[]{143.5} S_A \xrightleftharpoons[]{158.8} Ch \xrightleftharpoons[]{162.7} I$ |
| $C_5H_{11}-$ | 2 | $C \xrightleftharpoons[]{83.4} S_E \xrightleftharpoons[]{106.2} S_B \xrightleftharpoons[]{123.4} S_A \xrightleftharpoons[]{139.2} Ch \xrightleftharpoons[]{150.2} I$ |

TABLE 13-continued

| R | m | Phase transition temperature °C. |
|---|---|---|
| $C_7H_{15}-$ | 2 | $C \xrightleftharpoons{49.8} S_E \xrightleftharpoons{101.0} S_B \xrightleftharpoons{126.3} S_A \xrightleftharpoons{141.6} Ch \xrightleftharpoons{146.2} I$ |

EXAMPLE 25

Synthesis of p-n-octyloxybenzyl S-4'-(2-methylbutoxycarbonyl)-4-biphenylyl ether

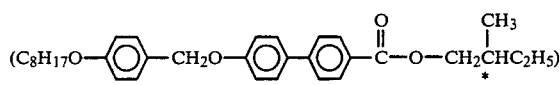

10 g of p-n-octyloxybenzyl alcohol, prepared by the reduction of p-n-octyloxybenzaldehyde with sodium borohydride was dissolved in 30 ml of benzene. Hydrogen chloride gas was passed through the solution on a hot-water bath at 60° C. Generated water was removed; the solution was dried over calcium chloride, and benzene was distilled off in vacuum, to obtain 12.3 g of the substituted benzyl chloride.

On the other hand, 9.6 g of S-4'-(2-methylbutyloxycarbonyl)-4-hydroxybiphenyl, 2.3 g of potassium hydroxide, and 35 ml of 95% ethanol were heated under stirring. A toluene (40 ml) solution of the above benzyl chloride was added thereto and heated under reflux for 2 hours. The reaction product was collected by the ordinary method and recrystallized from ethanol and then with ethyl acetate to obtain 2.9 g flaky crystals of the desired product. The melting point of the obtained compound was 97.3° C. The phase transition temperature (°C.) was as follows:

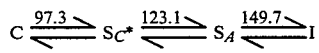

EXAMPLE 26

Synthesis of 4'-octyloxy-4-biphenylyl S-p-(2-methylbutoxycarbonyl)benzyl ether

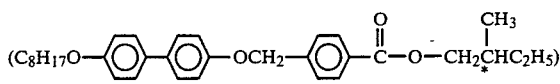

5 g of 4'-n-octyloxy-4-hydroxybiphenyl, 1.5 g of potassium hydrooxide, and 100 g of 95% ethanol were heated under reflux, and a solution wherein 4.2 g of p-bromobenzyl bromide was dissolved in 100 ml of ethanol was added thereto to effect reaction for 2 hours. The reaction liquid was treated in the ordinary method to obtain 6.1 g of 4'-n-octyloxy-4-biphenylyl p-bromobenzyl ether after recrystallization from ethyl acetate. The obtained product showed the following phase transition temperatures:

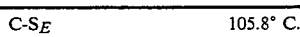

| | |
|---|---|
| $S_E$-$S_B$ | 189.5° C. |
| $S_B$-I | 206° C. |

6 g of the obtained bromo compound and 1.5 g of copper cyanate were heated under stirring at reflux for 8 hours. The solution was then treated with an acidic aqueous solution of ferric chloride at 60° C. for 1 hour, and a cyano compound was extracted therefrom with chloroform. The organic layer was washed with acidic water and then with alkaline water, and chloroform was distilled off in vacuum to obtain black residue. The residue was dissolved in toluene and decolored through an alumina chromatography column. After the solvent was distilled off in vacuum, the obtained solid matter was recrystallized from a mixed solvent of ethanol and ethyl acetate to obtain 4'-n-octyloxy-4-biphenylyl p-cyanobenzyl ether, the phase transition temperatures of which were:

| | |
|---|---|
| C-N | 127° C. |
| N-I | 171.5° C. |

4.4 g of this cyano compound was heated under reflux with 73 ml of ethylene glycol, 1.8 g of potassium hydroxide, and 3 ml of water. After the solution was cooled, diluted hydrochloric acid was added thereto to acidify the reaction liquid and crystals were collected by filtration. The crystals were recrystallized from 400 ml of acetic acid to obtain 4.1 g of 4-(4-n-octyloxybiphenylyl-4'-oxymethyl)benzoic acid. The phase transition temperatures of the obtained product were:

| | |
|---|---|
| C-$S_C$ | 193.6° C. |
| $S_C$-N | 254° C. |
| N-I | 279.2° C. |

2 g of 4-(4-n-octyloxybiphenylyl-4'-oxymethyl)benzoic acid and 5 ml of thionyl chloride were heated under stirring at 70° to 80° C. for 5 hours and excess thionyl chloride was distilled off in vacuum to obtain acid chloride crystals. 0.5 g of S(−)-2-methyl-1-butanol was dissolved in 5 ml of pyridine in another flask and admixed with said acid chloride. The mixture was left to stand overnight after stirring and admixed with 20 ml of toluene and 10 ml of water. The organic layer was washed with 6N HCl and then with 2N NaOH, and further with water until it was neutralized. After toluene was distilled off in vacuum, the residue was recrystallized from ethanol to obtain 1.1 g of desired 4'-n-octyloxy-4-biphenylyl S-p-(2-methylbutyloxycarbonyl)benzyl ether. The phase transition temperatures of the products are listed in Table 14.

TABLE 14

| Example | R | m | n | R* | Phase transition temperature °C. |
|---|---|---|---|---|---|
| 26 | $C_8H_{17}O-$ | 1 | 1 | $\begin{array}{c} CH_3 \\ | \\ -CH_2\overset{*}{C}HC_2H_5 \end{array}$ | $C \xrightleftharpoons{45.8} I$ |

TABLE 14-continued

| Example | R | m | n | R* | Phase transition temperature °C. |
|---|---|---|---|---|---|
| 26 | $C_8H_{17}O-$ | 2 | 1 | $-CH_2-\overset{*}{C}HC_2H_5$ with $CH_3$ branch | (Note) $C \underset{\longleftarrow}{\overset{37.0}{\longrightarrow}} S \underset{\longleftarrow}{\overset{114.0}{\longrightarrow}} S_{H^*} \underset{\longleftarrow}{\overset{133.8}{\longrightarrow}} S_{C^*} \underset{\longleftarrow}{\overset{162.5}{\longrightarrow}} S_A \underset{\longleftarrow}{\overset{165.8}{\longrightarrow}} I$ |
| 26 | $C_8H_{17}O-$ | 2 | 1 | $-\overset{*}{C}HC_6H_{13}$ with $CH_3$ branch | (Note) $C \underset{\longleftarrow}{\overset{58.8}{\longrightarrow}} S \underset{\longleftarrow}{\overset{106}{\longrightarrow}} S_{H^*} \underset{\longleftarrow}{\overset{121.5}{\longrightarrow}} S_{C^*} \underset{\longleftarrow}{\overset{134.8}{\longrightarrow}} I$ |

(Note) indicating an unidentified smectic phase

APPLICATION EXAMPLE 1

Figure 4:
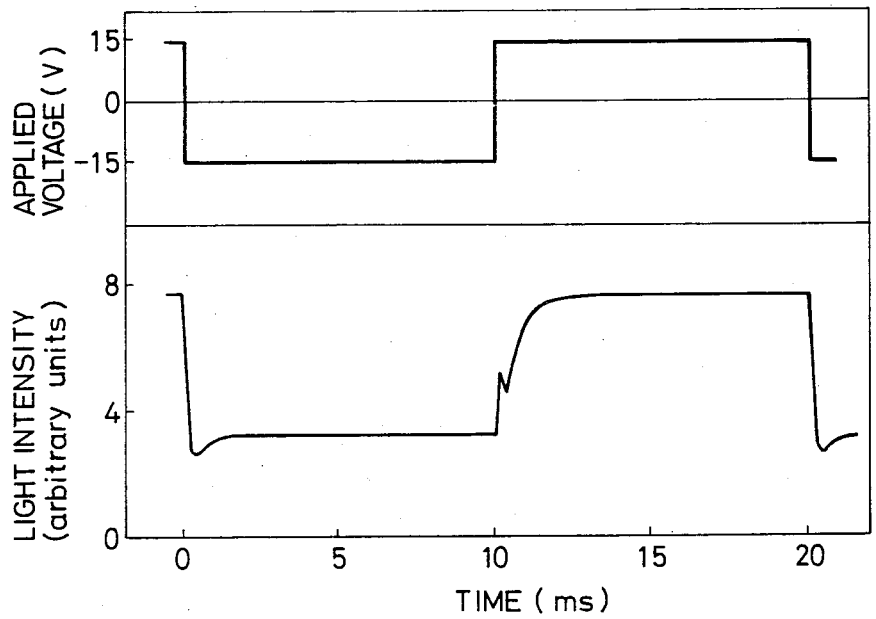
FIGS. 4 and 5 are illustrations of the response characteristics of liquid crystal display elements using the liquid crystal compositions prepared according to the methods described in the examples.

A liquid crystal display element containing the liquid crystal composition of Example 8 as a liquid crystal phase was prepared and evaluated for the response characteristics. The liquid crystal display element was manufactured by forming a polyimide polymer film on the glass substrates provided with transparent electrodes made of indium oxide. After rubbing of the substrates with gauze in a given direction, liquid crystal cells were arranged with glass fiber spacers so that the directions of rubbing of the two substrates were in parallel, wherein the liquid crystal composition of Example 8 was sealed in vacuum. The cells were arranged with a spacing of 5.4 μm. The liquid crystal display elements were placed between two crossing polarizers to measure changes in the intensity of transmitted light when electric voltage was applied. FIG. 4 is a graphical representation of the response wave measured at 30° C. In this figure, the ordinate shows applied voltage (v) and intensity of transmitted light (arbitrary units) and the abscissa shows time (ms). As understood from this figure, the liquid crystal display element of the present Example is characterized by excellent high-speed response, showing a response time of as short as 1 ms.

APPLICATION EXAMPLE 2

Figure 5:
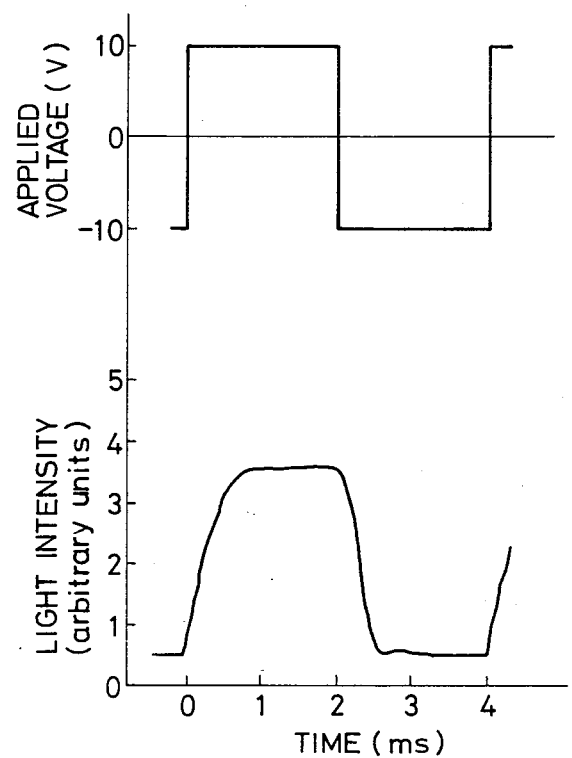

A liquid crystal display element containing the liquid crystal composition of Example 13 as a liquid crystal phase was prepared and evaluated for the response characteristics. The liquid crystal display element was manufactured by forming a polyimide polymer film on the glass substrates provided with transparent electrodes made of indium oxide. After rubbing the substrates with gauze in a given direction, liquid crystal cells were arranged with glass fiber spacers so that the rubbing directions of the two substrates were in parallel, wherein the liquid crystal composition of Example 13 was sealed in vacuum. The cells were arranged with a spacing of 5.4 μm. The liquid crystal display elements were placed between two crossing polarizers to measure changes in the intensity of transmitted light when electric voltage was applied. FIG. 5 is a graphical representation of the response wave measured at 24° C. As understood from this figure, the liquid crystal display element of the present Example is characterized by excellent high-speed response, showing a response time of as short as about 1 ms.

We claim:

1. A ferroelectric liquid crystal compound selected from the group consisting of:
4-n-heptyloxy-4'-biphenylcarboxylic acid p'-(2-methylbutoxycarbonyl)phenyl ester,
4-n-pentyloxy-4'-biphenylcarboxylic acid p'-(2-methylbutoxycarbonyl)phenyl ester,
4-n-hexyloxy-4'-biphenylcarboxylic acid p'-(2-methylbutoxycarbonyl)phenyl ester,
4-n-octyloxy-4'-biphenylcarboxylic acid p'-(2-methylbutoxycarbonyl)phenyl ester,
4-n-nonyloxy-4'-biphenylcarboxylic acid p'-(2-methylbutoxycarbonyl)phenyl ester,
4-n-decyloxy-4'-biphenylcarboxylic acid p'-(2-methylbutoxycarbonyl)phenyl ester,
4-n-undecyloxy-4'-biphenylcarboxylic acid p'-(2-methylbutoxycarbonyl)phenyl ester,
4-n-dodecyloxy-4'-biphenylcarboxylic acid p'-(2-methylbutoxycarbonyl)phenyl ester,
4-n-hexyl-4'-biphenylcarboxylic acid p'-(2-methylbutoxycarbonyl)phenyl ester,
4-n-heptyl-4'-biphenylcarboxylic acid p'-(2-methylbutoxycarbonyl)phenyl ester,
4-n-octyl-4'-biphenylcarboxylic acid p'-(2-methylbutoxycarbonyl)phenyl ester,
4-n-nonyl-4'-biphenylcarboxylic acid p'-(2-methylbutoxycarbonyl)phenyl ester,
4-n-decyl-4'-biphenylcarboxylic acid p'-(2-methylbutoxycarbonyl)phenyl ester,
4-n-undecyl-4'-biphenylcarboxylic acid p'-(2-methylbutoxycarbonyl)phenyl ester,
4-n-dodecyl-4'-biphenylcarboxylic acid p'-(2-methylbutoxycarbonyl)phenyl ester,
p-n-pentyloxybenzoic acid 4'-(2-methylbutoxycarbonyl)-4-biphenylyl ester,
p-n-hexyloxybenzoic acid 4'-(2-methylbutoxycarbonyl)-4-biphenylyl ester,
p-n-heptyloxybenzoic acid 4'-(2-methylbutoxycarbonyl)-4-biphenylyl ester,
p-n-octyloxybenzoic acid 4'-(2-methylbutoxycarbonyl)-4-biphenylyl ester,
p-n-nonyloxybenzoic acid 4'-(2-methylbutoxycarbonyl)-4-biphenylyl ester,
p-n-decyloxybenzoic acid 4'-(2-methylbutoxycarbonyl)-4-biphenylyl ester,
p-n-undecyloxybenzoic acid 4'-(2-methylbutoxycarbonyl)-4-biphenylyl ester,
p-n-dodecyloxybenzoic acid 4'-(2-methylvbutoxycarbonyl)-4-biphenylyl ester,
p-n-hexylbenzoic acid 4'-(2-methylbutoxycarbonyl)-4-biphenylyl ester,
p-n-heptylbenzoic acid 4'-(2-methylbutoxycarbonyl)-4-biphenylyl ester,
p-n-nonylbenzoic acid 4'-(2-methylbutoxycarbonyl)-4-biphenylyl ester,
p-n-decylbenzoic acid 4'-(2-methylbutoxycarbonyl)-4-biphenylyl ester,
p-n-undecylbenzoic acid 4'-(2-methylbutoxycarbonyl)-4-biphenylyl ester,
p-n-dodecylbenzoic acid 4'-(2-methylbutoxycarbonyl)-4-biphenylyl ester, 4'-n-decyloxy-4-biphenylyl S-p-(2-methylbutoxycarbonyl)benzoate,
p-n-octyloxybenzyl S-4'-(2-methylbutoxycarbonyl)-4-biphenylyl ether, and
4'-n-octyloxy-4-biphenylyl S-p-(2-methylbutoxycarbonyl)benzyl ether.

2. The ferroelectric liquid crystal compound as set forth in claim 1, wherein said compound is selected from the group consisting of:
4-n-heptyloxy-4'-biphenylcarboxylic acid p'-(2-methylbutoxycarbonyl)phenyl ester,
4-n-octyloxy-4'-biphenylcarboxylic acid p'-(2-methylbutoxycarbonyl)phenyl ester,
4-n-nonyloxy-4'-biphenylcarboxylic acid p'-(2-methylbutoxycarbonyl)phenyl ester,
4-n-decyloxy-4'-biphenylcarboxylic acid p'-(2-methylbutoxycarbonyl)phenyl ester,
4-n-hexyl-4'-biphenylcarboxylic acid p'-(2-methylbutoxycarbonyl)phenyl ester,
4-n-heptyl-4'-biphenylcarboxylic acid p'-(2-methylbutoxycarbonyl)phenyl ester,
4-n-octyl-4'-biphenylcarboxylic acid p'-(2-methylbutoxycarbonyl)phenyl ester,
4-n-nonyl-4'-biphenylcarboxylic acid p'-(2-methylbutoxycarbonyl)phenyl ester,
4-n-decyl-4'-biphenylcarboxylic acid p'-(2-methylbutoxycarbonyl)phenyl ester,
4-n-dodecyl-4'-biphenylcarboxylic acid p'-(2-methylbutoxycarbonyl)phenyl ester,
p-n-pentyloxybenzoic acid 4'-(2-methylbutoxycarbonyl)-4-biphenylyl ester,
p-n-hexyloxybenzoic acid 4'-(2-methylbutoxycarbonyl)-4-biphenylyl ester,
p-n-heptyloxybenzoic acid 4'-(2-methylbutoxycarbonyl)-4-biphenylyl ester,
p-n-octyloxybenzoic acid 4'-(2-methylbutoxycarbonyl)-4-biphenylyl ester,
p-n-hexylbenzoic acid 4'-(2-methylbutoxycarbonyl)-4-biphenylyl ester,
p-n-heptylbenzoic acid 4'-(2-methylbutoxycarbonyl)-4-biphenylyl ester,
4'-n-decyloxy-4-biphenylyl S-p-(2-methylbutoxycarbonyl)benzoate,
p-n-octyloxybenzyl S-4'-(2-methylbutoxycarbonyl)-4-biphenylyl ether, and
4'-n-octyloxy-4-biphenylyl S-p-(2-methylbutoxycarbonyl)benzyl ether.

3. A ferroelectric liquid crystal composition containing as components thereof a mixture of a plurality of ferroelectric liquid crystal compounds, said ferroelectric liquid crystal compounds comprising at least one compound from the group consisting of:
4-n-heptyloxy-4'-biphenylcarboxylic acid p'-(2-methylbutoxycarbonyl)phenyl ester,
4-n-pentyloxy-4'-biphenylcarboxylic acid p'-(2-methylbutoxycarbonyl)phenyl ester,
4-n-hexyloxy-4'-biphenylcarboxylic acid p'-(2-methylbutoxycarbonyl)phenyl ester,
4-n-octyloxy-4'-biphenylcarboxylic acid p'-(2-methylbutoxycarbonyl)phenyl ester,
4-n-nonyloxy-4'-biphenylcarboxylic acid p'-(2-methylbutoxycarbonyl)phenyl ester,
4-n-decyloxy-4'-biphenylcarboxylic acid p'-(2-methylbutoxycarbonyl)phenyl ester,
4-n-undecyloxy-4'-biphenylcarboxylic acid p'-(2-methylbutoxycarbonyl)phenyl ester,
4-n-dodecyloxy-4'-biphenylcarboxylic acid p'-(2-methylbutoxycarbonyl)phenyl ester,
4-n-hexyl-4'-biphenylcarboxylic acid p'-(2-methylbutoxycarbonyl)phenyl ester,
4-n-heptyl-4'-biphenylcarboxylic acid p'-(2-methylbutoxycarbonyl)phenyl ester,
4-n-octyl-4'-biphenylcarboxylic acid p'-(2-methylbutoxycarbonyl)phenyl ester, P0 4-n-nonyl-4'-biphenylcarboxylic acid p'-(2-methylbutoxycarbonyl)phenyl ester,
4-n-decyl-4'-biphenylcarboxylic acid p'-(2-methylbutoxycarbonyl)phenyl ester,
4-n-undecyl-4'-biphenylcarboxylic acid p'-(2-methylbutoxycarbonyl)phenyl ester,
4-n-dodecyl-4'-biphenylcarboxylic acid p'-(2-methylbutoxycarbonyl)phenyl ester,
p-n-pentyloxybenzoic acid 4'-(2-methylbutoxycarbonyl)-4-biphenylyl ester,
p-n-hexyloxybenzoic acid 4'-(2-methylbutoxycarbonyl)-4-biphenylyl ester,
p-n-heptyloxybenzoic acid 4'-(2-methylbutoxycarbonyl)-4-biphenylyl ester,
p-n-octyloxybenzoic acid 4'-(2-methylbutoxycarbonyl)-4-biphenylyl ester,
p-n-nonyloxybenzoic acid 4'(2-methylbutoxycarbonyl)-4-biphenylyl ester,
p-n-decyloxybenzoic acid 4'-(2-methylbutoxycarbonyl)-4-biphenylyl ester,
p-n-undecyloxybenzoic acid 4'-(2-methylbutoxycarbonyl)-4-biphenylyl ester,
p-n-dodecyloxybenzoic acid 4'-(2-methylbutoxycarbonyl)-4-biphenylyl ester,
p-n-hexylbenzoic acid 4'-(2-methylbutoxycarbonyl)-4-biphenylyl ester,
p-n-heptylbenzoic acid 4'-(2-methylbutoxycarbonyl)-4-biphenylyl ester,
p-n-nonylbenzoic acid 4'-(2-methylbutoxycarbonyl)-4-biphenylyl ester,
p-n-decylbenzoic acid 4'-(2-methylbutoxycarbonyl)-4-biphenylyl ester,
p-n-undecylbenzoic acid 4'-(2-methylbutoxycarbonyl)-4-biphenylyl ester,
p-n-dodecylbenzoic acid 4'-(2-methylbutoxycarbonyl)-4-biphenylyl ester,
4'-n-decyloxy-4-biphenylyl S-p-(2-methylbutoxycarbonyl)benzoate,
p-n-octyloxybenzyl S-4'-(2-methylbutoxycarbonyl)-4-biphenylyl ether, and
4'-n-octyloxy-4-biphenylyl S-p-(2-methylbutoxycarbonyl)benzyl ether.

4. The ferroelectric liquid crystal composition as set forth in claim 3, wherein said at least one compound from said group is selected from the subgroup consisting of:
4-n-heptyloxy-4'-biphenylcarboxylic acid p'-(2-methylbutoxycarbonyl)phenyl ester,
4-n-octyloxy-4'-biphenylcarboxylic acid p'-(2-methylbutoxycarbonyl)phenyl ester,
4-n-nonyloxy-4'-biphenylcarboxylic acid p'-(2-methylbutoxycarbonyl)phenyl ester,
4-n-decyloxy-4'-biphenylcarboxylic acid p'-(2-methylbutoxycarbonyl)phenyl ester,
4-n-hexyl-4'-biphenylcarboxylic acid p'-(2-methylbutoxycarbonyl)phenyl ester,
4-n-heptyl-4'-biphenylcarboxylic acid p'-(2-methylbutoxycarbonyl)phenyl ester,
4-n-octyl-4'-biphenylcarboxylic acid p'-(2-methylbutoxycarbonyl)phenyl ester,
4-n-nonyl-4'-biphenylcarboxylic acid p'-(2-methylbutoxycarbonyl)phenyl ester, 4-n-decyl-4'-biphenylcarboxylic acid p'-(2-methylbutoxycarbonyl)phenyl ester,
4-n-dodecyl-4'-biphenylcarboxylic acid p'-(2-methylbutoxycarbonyl)phenyl ester,
p-n-pentyloxybenzoic acid 4'-(2-methylbutoxycarbonyl)-4-biphenylyl ester, from said sub-group and a further ferroelectric liquid crystal compound.

7. The ferroelectric liquid crystal composition as set forth in claim 6, wherein said further ferroelectric liquid crystal compound is selected from the group consisting of:

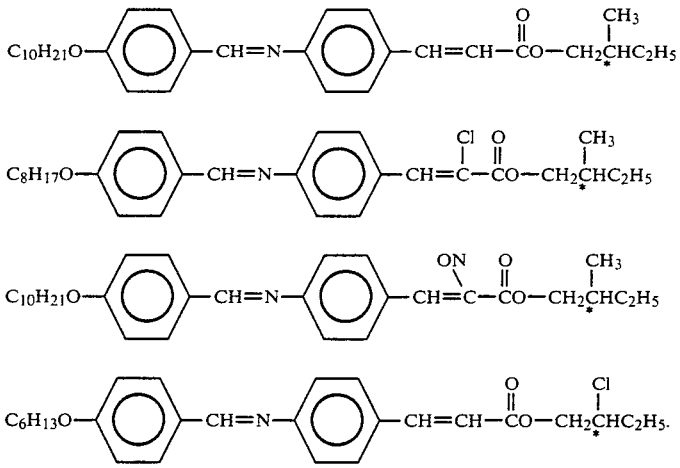

p-n-hexyloxybenzoic acid 4'-(2-methylbutoxycarbonyl)-4-biphenylyl ester,
p-n-heptyloxybenzoic acid 4'-(2-methylbutoxycarbonyl)-4-biphenylyl ester,
p-n-octyloxybenzoic acid 4'-(2-methylbutoxycarbonyl)-4-biphenylyl ester,
p-n-hexylbenzoic acid 4'-(2-methylbutoxycarbonyl)-4-biphenylyl ester,
p-n-heptylbenzoic acid 4'-(2-methylbutoxycarbonyl)-4-biphenylyl ester,
4'-n-decyloxy-4-biphenylyl S-p-(2-methylbutoxycarbonyl)benzoate,
p-n-octyloxybenzyl S-4'-(2-methylbutoxycarbonyl)-4-biphenylyl ether, and
4'-n-octyloxy-4-biphenylyl S-p-(2-methylbutoxycarbonyl)benzyl ether.

5. The ferroelectric liquid crystal composition as set forth in claim 4, wherein said plurality of ferroelectric liquid crystal compounds includes at least two selected from said sub-group.

6. The ferroelectric liquid crystal composition as set forth in claim 4, wherein said plurality of ferroelectric liquid crystal compounds includes at least one selected 8. The ferroelectric liquid crystal composition as set forth in claim 6, wherein said further ferroelectric liquid crystal compound is 2-methylbutyl p-alkyloxybenzylidene-p'-amino cinnamate.

9. The ferroelectric liquid crystal composition as set forth in claim 3, wherein said plurality of ferroelectric liquid crystal compounds includes at least two selected from said group.

10. The ferroelectric liquid crystal composition as set forth in claim 3, wherein said plurality of ferroelectric liquid crystal compounds includes at least one selected from said group and a further ferroelectric liquid crystal compound.

11. The ferroelectric liquid crystal composition as set forth in claim 10, wherein said further ferroelectric liquid crystal compound is selected from the group consisting of:

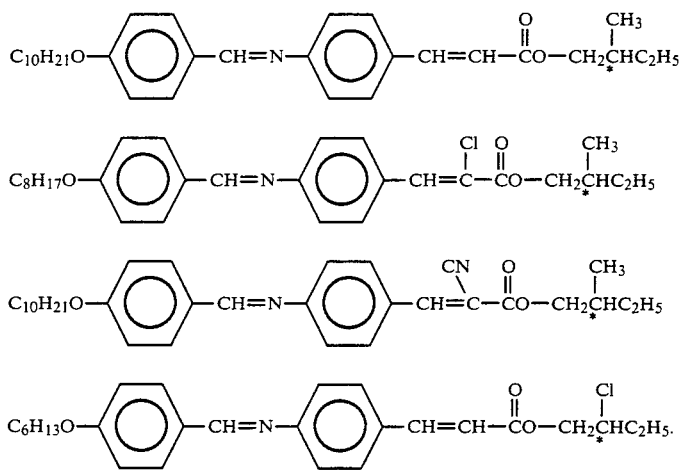

12. The ferroelectric liquid crystal composition as set forth in claim 10, wherein said further ferroelectric liquid crystal compound is 2-methylbutyl p-alkyloxybenzylidene-p'-amino cinnamate.

* * * * *